US012776803B1

(12) United States Patent
Ying

(10) Patent No.: US 12,776,803 B1
(45) Date of Patent: Oct. 27, 2026

(54) FREQUENCY DIVISION DUPLEX TRANSCEIVER HAVING N-PATH MIXER BIAS CURRENT STEERING AND SINUSOIDAL VOLTAGE GATE DRIVER WITH TRANSMIT SIGNAL SUPPRESSION IN RECEIVE PATH

(71) Applicant: HRL Laboratories, LLC, Malibu, CA (US)

(72) Inventor: Robin C. Ying, Alhambra, CA (US)

(73) Assignee: HRL Laboratories, LLC, Malibu, CA (US)

( * ) Notice: Subject to any disclaimer, the term of this patent is extended or adjusted under 35 U.S.C. 154(b) by 22 days.

(21) Appl. No.: 19/077,885

(22) Filed: Mar. 12, 2025

Related U.S. Application Data

(63) Continuation-in-part of application No. 18/822,000, filed on Aug. 30, 2024, now Pat. No. 12,634,177.
(Continued)

(51) Int. Cl.
*H04B 1/40* (2015.01)
*H04B 1/403* (2015.01)
*H04L 5/14* (2006.01)

(52) U.S. Cl.
CPC ............... *H04B 1/403* (2013.01); *H04L 5/14* (2013.01)

(58) Field of Classification Search
CPC .................................. H04B 1/403; H04L 5/14
See application file for complete search history.

(56) References Cited

U.S. PATENT DOCUMENTS

| | | | |
|---|---|---|---|
| 9,608,688 B2 * | 3/2017 | Khlat | H04B 1/0057 |
| 2014/0219142 A1 * | 8/2014 | Schulz | H04L 5/14 370/280 |

(Continued)

OTHER PUBLICATIONS

D. Dimlioglu et al.; "Demonstration of a Ku-Band N-Path Downconverter in GaN-on-SiC," Proceedings of the 2023 IEEE BiCMOS and Compound Semiconductor Integrated Circuits and Technology Symposium (BCICTS), pp. 106-109, 2023, IEEE.

(Continued)

*Primary Examiner* — Dac V Ha
(74) *Attorney, Agent, or Firm* — Wheatstone IP Law Corporation; Milad G. Shara

(57) ABSTRACT

A frequency division duplex transceiver comprises a quadrature hybrid coupler, and first and second baseband down-conversion circuits. The hybrid coupler provides a transmit signal (Tx) to an antenna, receives a receive signal (Rx) from the antenna, and receives a pre-transmit signal from a pre-transmit signal generator. Each baseband down-conversion circuit cyclically steers bias current to commutate mixer transistors in response to sinusoidal voltage gate drivers from a local oscillator signal generator. In the first baseband down-conversion circuit, a first N-path mixer receives an in-phase (I) receive component from the hybrid coupler, and a first baseband load reflects a quadrature (Q) pre-transmit component. In the second baseband down-conversion circuit, a second N-path mixer receives a Q receive component from the hybrid coupler, and a second baseband load reflects I pre-transmit component. The hybrid coupler provides Tx to the antenna in response to reflected Q pre-transmit component and reflected I pre-transmit component.

26 Claims, 11 Drawing Sheets

Related U.S. Application Data

(60) Provisional application No. 63/635,449, filed on Apr. 17, 2024.

(56) References Cited

U.S. PATENT DOCUMENTS

| | | | | |
|---|---|---|---|---|
| 2019/0207288 | A1* | 7/2019 | Zhu | H04L 5/143 |
| 2020/0266794 | A1* | 8/2020 | Jian | H03H 7/463 |

OTHER PUBLICATIONS

Y. Zhu et al.; "A 38-GS/s 7-bit Pipelined-SAR ADC with Speed-Enhanced Bootstrapped Switch and Output Level Shifting Technique in 22-nm FinFET," IEEE Journal of Solid-State Circuits, vol. 58, No. 8, pp. 2300-2313, Aug. 2023, IEEE.

E. Zolkov et al.; "A 1-2-GHz Quadrature Balanced N-Path Receiver for Frequency Division Duplex Systems." IEEE Transactions on Microwave Theory and Techniques, vol. 70, No. 1, pp. 597-612, Jan. 2022.

R. Ying et al.; "Impedance Transparency and Performance Metrics of HBT-Based N-Path Mixers for mmWave Applications," IEEE Transactions on Circuits and Systems I: Regular Papers, vol. 68, No. 5, pp. 2210-2223, May 2021, IEEE.

R. Ying et al.; "A 20-40 GHz High Dynamic Range HBT N-Path Receiver With 8.9 dBm OOB B1dB and 8.55 dB NF Consuming 130 mW," Proceedings of the 2021 IEEE Radio Frequency Integrated Circuits Symposium (RFIC), pp. 215-218, 2021, IEEE.

M. Morton et al.; "The RF Sampler: Chip-Scale Frequency Conversion and Filtering Enabling Affordable Element-Level Digital Beamforming," Proceedings of the IEEE International Microwave Symposium (IMS), pp. 14-18, 2018, IEEE.

R. Ying et al.; "A HBT-Based 300 MHZ-12 GHz Blocker-Tolerant Mixer-First Receiver," Proceedings of the IEEE Bipolar/BiCMOS Circuits and Technology Meeting (BCTM); pp. 31-34, 2017, IEEE.

N.M. Amin et al.; "An I/Q mixer with an integrated differential quadrature all-pass filter for on-chip quadrature LO signal generation", Journal of Semiconductors, vol. 36, No. 5, May 2015, pp. 055001-1 to 055001-9. Chinese Institute of Electronics.

K. Shinohara et al.; "Scaling of GaN HEMTs and Schottky Diodes for Submillimeter-Wave MMIC Applications," IEEE Transactions on Electron Devices, vol. 60, No. 10, pp. 2982-2996, Oct. 2013, IEEE.

C. Andrews et al.; "A Passive Mixer-First Receiver With Digitally Controlled and Widely Tunable RF Interface," IEEE Journal of Solid-State Circuits, vol. 45, No. 12, pp. 2696-2708, Dec. 2010, IEEE.

M. Do et al.; "AlGaN/GaN Mixer MMICs, and RF Front-End Receivers for C-, Ku-, and Ka-Band Space Applications," Proceedings of the 5th European Microwave Integrated Circuits Conference (EuMIC), pp. 57-60, Paris, France, 2010, IEEE.

* cited by examiner

| Pre-Transmit Signal Center Frequency (3 to 27 GHz) | Receive Signal Center Frequency (2 to 28 GHz) | | | | | | | | | | | | | |
|---|---|---|---|---|---|---|---|---|---|---|---|---|---|---|
| | 2 | 4 | 6 | 8 | 10 | 12 | 14 | 16 | 18 | 20 | 22 | 24 | 26 | 28 |
| 3 | 37 | 34 | -2.4 | -32 | -54 | -68 | -78 | -87 | -94 | -100 | -105 | -110 | -114 | -118 |
| 5 | -1.2 | 37 | 32 | -3.4 | -39 | -57 | -71 | -82 | -90 | -97 | -104 | -109 | -114 | -118 |
| 7 | -33 | -1.2 | 31 | 19 | -17 | -45 | -73 | -87 | -98 | -107 | -115 | -122 | -128 | -134 |
| 9 | -55 | -34 | -2.4 | 29 | 23 | -12 | -47 | -64 | -77 | -87 | -95 | -102 | -108 | -114 |
| 11 | -68 | -55 | -35 | -5 | 28 | 23 | -9.7 | -48 | -65 | -78 | -89 | -98 | -103 | -109 |
| 13 | -81 | -73 | -57 | -37 | -11 | 24 | 19 | -13 | -50 | -67 | -78 | -90 | -98 | -107 |
| 15 | -93 | -85 | -78 | -65 | -56 | -15 | 20 | 16 | -24 | -53 | -72 | -84 | -94 | -106 |
| 17 | -100 | -92 | -88 | -80 | -67 | -43 | -17 | 21 | 19 | -17 | -53 | -73 | -87 | -98 |
| 19 | -103 | -98 | -92 | -82 | -70 | -54 | -39 | -14 | 23 | 23 | -11 | -46 | -63 | -75 |
| 21 | -107 | -103 | -97 | -89 | -80 | -68 | -53 | -37 | -11 | 27 | 26 | -8.8 | -42 | -59 |
| 23 | -113 | -109 | -102 | -96 | -87 | -77 | -66 | -52 | -37 | -9.4 | 27 | 27 | -9.5 | -41 |
| 25 | -120 | -116 | -111 | -104 | -101 | -90 | -80 | -67 | -56 | -39 | -12 | 24 | 25 | -12 |
| 27 | -130 | -126 | -123 | -116 | -111 | -104 | -95 | -84 | -73 | -62 | -46 | -18 | 14 | 16 |

Table Entries Correspond to Pre-Transmit Signal Leakage Baseband Power (dBm)

FREQUENCY DIVISION DUPLEX TRANSCEIVER HAVING N-PATH MIXER BIAS CURRENT STEERING AND SINUSOIDAL VOLTAGE GATE DRIVER WITH TRANSMIT SIGNAL SUPPRESSION IN RECEIVE PATH

CROSS-REFERENCE TO RELATED APPLICATIONS

This application is a continuation-in-part of U.S. Non-provisional patent application Ser. No. 18/822,000, titled "N-PATH BASEBAND DOWN-CONVERSION WITH BIAS CURRENT STEERING AND SINUSOIDAL VOLTAGE DRIVERS FOR TRANSISTOR COMMUTATION" filed Aug. 30, 2024, which claims priority to U.S. Provisional Application No. 63/635,449, titled "ACTIVE GaN N-PATH FILTER WITH OVERLAP-INDUCED-LOSS SUPPRESSION" filed on Apr. 17, 2024, each of which is incorporated herein by reference in its entirety.

TECHNICAL FIELD

The present description relates to frequency division duplex transceivers, and baseband down-conversion with N-path mixers and filters.

BACKGROUND

Frequency division duplex systems use transceiver circuits that incorporate transmit signal leakage cancellation and down-conversion receivers to support simultaneous communication of transmit and receive signals on different frequency bands. These down-conversion receivers include N-path mixers and filters, which are being developed for the millimeter-wave (mm-wave) frequency range.

There is a need for transceiver circuits that integrate transmit signal leakage cancellation and down-conversion receivers for communication in the mm-wave frequency range.

DESCRIPTION OF DRAWINGS

Like reference symbols in the various figures indicate like elements.

DETAILED DESCRIPTION

Figure 1A:
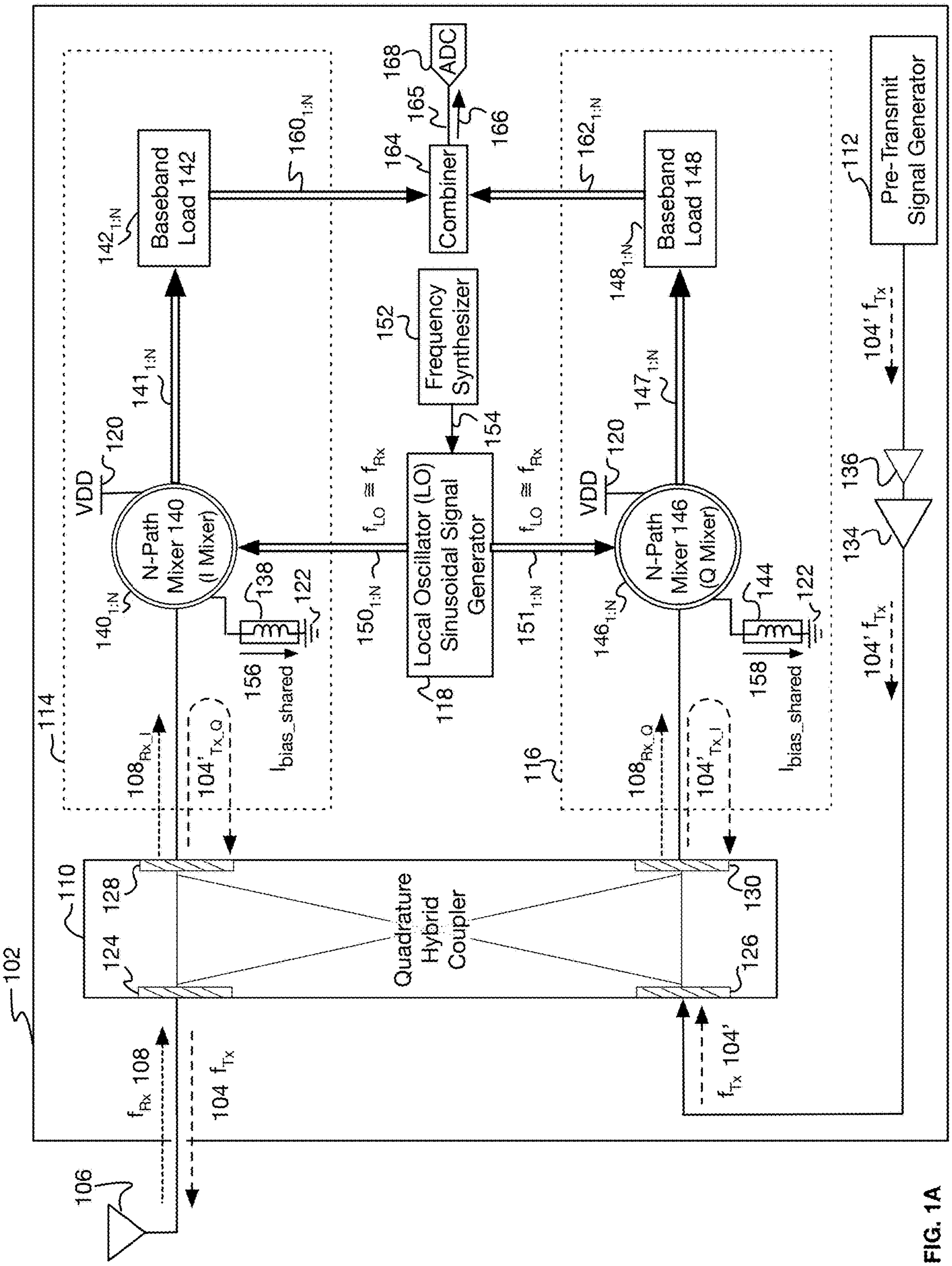
FIG. 1A is a diagram illustrating a frequency division duplex transceiver including a quadrature hybrid coupler coupled to first and second baseband down-conversion circuits with N-path mixers configured to use bias current steering and baseband loads having frequency selective low pass filters to reflect pre-transmit signals and pass receive signals according to an embodiment.

The disclosed embodiments illustrate frequency division duplex transceivers having simultaneous transmit and receive circuits and methods for ultra-wideband transmit signal leakage suppression and baseband down-conversion in mm-wave frequency range such as for communication applications with frequency spectrum up to 40 GHz. According to an embodiment, a frequency division duplex transceiver includes a quadrature hybrid coupler coupled to first and second baseband down-conversion circuits with N-path mixers using transistor bias current steering and sinusoidal voltage gate drivers, and baseband loads having frequency selective low pass filters such as elliptic filters. A first baseband load reflects a quadrature (Q) pre-transmit component of a pre-transmit signal and passes an in-phase (I) receive component of a receive signal, and a second baseband load reflects an I pre-transmit component of the pre-transmit signal and passes a Q receive component of the receive signal. The quadrature hybrid coupler receives the receive signal having a receive frequency from an antenna, and provides a transmit signal having a transmit frequency to the antenna in response to the reflected Q pre-transmit component and the reflected I pre-transmit component having the transmit frequency that is different than the receive frequency. The N-path mixers may be configured to use the bias current steering and sinusoidal voltage gate drivers to achieve performance requirements for low noise figure, high dynamic input signal range, low power consumption, and wideband operation in the mm-wave frequency range. The baseband load has frequency selective filters that present low impedance out-of-band to reflect the I and Q components of the pre-transmit signal, and an impedance match in-band, such as 50Ω, to pass the I and Q components of the receive signal. The quadrature hybrid coupler adds the reflected Q and I components of the pre-transmit signal to provide the transmit signal to the antenna.

According to an embodiment, a combiner may be configured to a) combine receive signal components having an in-phase relationship in first and second plurality of baseband signals respectively to provide a combined baseband receive signal; and b) combine pre-transmit leakage components having an anti-phase relationship in the first and second plurality of baseband signals respectively to cancel or suppress transmit leakage flow in a baseband receiver path. The combiner may cancel or suppress pre-transmit leakage components of the pre-transmit signal and any harmonics of the pre-transmit signal.

According to an embodiment, the N-path mixers can be driven by quadrature-phased sinusoids with about 6 dB noise figure. For a frequency division duplex transceiver with 2 GHz bandwidth, the minimum detectable signal may be about −74 dBm, and for about 4 dB signal to noise ratio (SNR), the minimum detectable signal may be −70 dBm. Simulation data demonstrates ultra-wideband transmit signal (Tx) leakage suppression such that transmit signals having power up to 30 dBm and receive signals having power as weak as −70 dBm fall within an input range for 2 GHz baseband analog-to-digital converters (nominally −0 dBm to −60 dBm).

The disclosed embodiments include an indexed numbering system with subscripts having lowercase letters n and c in to identify 1) an $n^{th}$ baseband down-conversion path in a number of N parallel baseband down-conversion paths, where n is an integer 1 to N, and N is an integer of 2 or more, and 2) a $c^{th}$ periodic sinusoidal intersection in a number of C periodic sinusoidal intersections, where C==N. The $n^{th}$ baseband down-conversion path includes an $n^{th}$ transistor an $n^{th}$ drain supply load, and an $n^{th}$ low pass filter. The $c^{th}$ periodic sinusoidal intersection corresponds to a $c^{th}$ commutation period for transitioning between an $n^{th}$ transistor in a current $n^{th}$ baseband down-conversion path and an $(n+1)^{th}$ transistor in a next $(n+1)^{th}$ baseband down-conversion path.

Figure 1B:
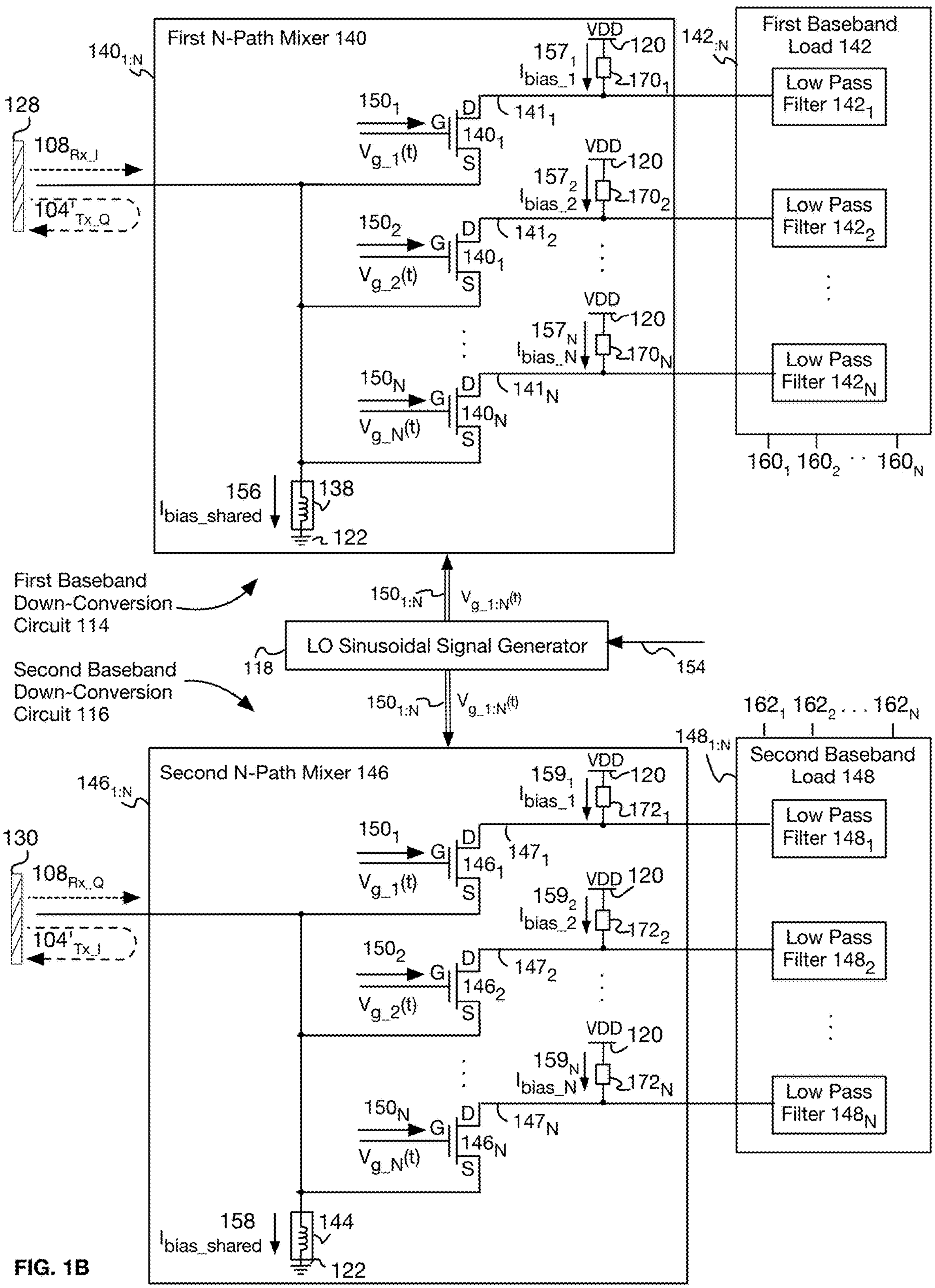
FIG. 1B is a diagram illustrating configuration of the N-path mixers and the baseband loads in the first and second baseband down-conversion circuits of FIG. 1A according to an embodiment.

FIGS. 1A-1B illustrate a frequency division duplex transceiver 102, as shown in FIG. 1A, and a configuration of first and second N-path mixers (140, 146) using bias current steering to provide first and second plurality of mixed signals ($\mathbf{141}_{1:N}$, $\mathbf{147}_{1:N}$) to first and second baseband loads (142, 148) respectively within the frequency division duplex transceiver 102 as shown in FIG. 1B, according to an embodiment. The first N-path mixer 140 includes a first plurality of mixer transistors $\mathbf{140}_{1:N}$, and the second N-path mixer 146 includes a second plurality of mixer transistors $\mathbf{146}_{1:N}$. The first baseband load 142 includes a first plurality of low pass filters $\mathbf{142}_{1:N}$, and the second baseband load 148 includes a second plurality of low pass filters $\mathbf{148}_{1:N}$. The low pass filters may be active or passive low pass filters.

Referring to FIG. 1A, the frequency division duplex transceiver 102 includes a quadrature hybrid coupler 110, a transmit signal generator such as a pre-transmit signal generator 112, a first baseband down-conversion circuit 114 and a second baseband down-conversion circuit 116, and a local oscillator (LO) sinusoidal signal generator 118. The quadrature hybrid coupler 110 includes a first port 124 such as an input port or antenna port, a second port 126 such as an isolation port, a third port 128 such as a through port, and a fourth port 130 such as a coupled port according to embodiment. The first port 124 is configured to provide a transmit signal (Tx) 104 having a transmit frequency $f_{Tx}$ to an antenna 106, and receive a receive signal (Rx) 108 having a receive frequency $f_{Rx}$ different than the transmit frequency $f_{Tx}$ from the antenna 106. The pre-transmit signal generator 112 is configured to provide a pre-transmit signal 104' having the transmit frequency to the second port 126. A power amplifier 134 together with a pre-amplifier 136 may be configured to amplify the pre-transmit signal 104'. In an embodiment, the pre-transmit signal generator 112 may include the power amplifier 134 and the pre-amplifier 136 to provide the pre-transmit signal 104'. The quadrature hybrid coupler 110 and the LO sinusoidal signal generator 118 each include couplers that are configured to provide balanced amplitude and phase signals suitable for noise figure performance of baseband signals and transmit signal leakage suppression.

According to an embodiment, the first baseband down-conversion circuit 114 illustrated in FIGS. 1A-1B includes the first plurality of mixer transistors $\mathbf{140}_{1:N}$ (first N-path mixer 140) and a first shared current source 138 that is configured to draw a first shared bias current 156 from a direct current (DC) voltage supply at a DC voltage supply rail 120. A source of each mixer transistor $\mathbf{140}_n$ in the first plurality of mixer transistors $\mathbf{140}_{1:N}$ is coupled to the third port 128 and the first end of the first shared current source 138. The second baseband down-conversion circuit 116 includes the second plurality of mixer transistors $\mathbf{146}_{1:N}$ (second N-path mixer 146) and a second shared current source 144 that is configured to draw a second shared bias current 158 from the DC voltage supply at the DC voltage supply rail 120. A source of each mixer transistor $\mathbf{146}_n$ in the second plurality of mixer transistors $\mathbf{146}_{1:N}$ is coupled to the fourth port 130 and a first end of the second shared current source 144. A ground terminal 122 is coupled to a second end of the first shared current source 138 and a second end of the second shared current source 144. The first shared current source 138 may include a first inductor and the second shared current source 144 may include a second inductor. The first inductor and the second inductor are each configured as a direct current biasing inductor shunt to the ground terminal 122.

The LO sinusoidal signal generator 118 may be coupled to a gate of each mixer transistor $\mathbf{140}_n$ in the first plurality of mixer transistors $\mathbf{140}_{1:N}$ and a gate of each mixer transistor $\mathbf{146}_n$ in the second plurality of mixer transistors $\mathbf{146}_{1:N}$, as illustrated in FIG. 1B. The LO sinusoidal signal generator 118 is configured to provide a plurality of phase-shifted sinusoidal voltage signals $\mathbf{150}_{1:N}$ having a signal frequency $f_{LO}$ that is substantially equal to the receive frequency $f_{Rx}$. A frequency synthesizer 152 may be configured to provide a single-ended sinusoidal voltage signal 154 having the signal frequency $f_{LO}$, and the LO sinusoidal signal generator 118 generates the phase-shifted sinusoidal voltage signals $\mathbf{150}_{1:N}$ in response to the single-ended sinusoidal voltage signal 154. The LO sinusoidal signal generator 118 may be a tunable LO sinusoidal signal generator that tunes the single-ended sinusoidal voltage signal 154 to the signal frequency $f_{LO}$ substantially equal to the receive frequency. According to an embodiment, the frequency synthesizer 152 may be configured as a 2-40 GHz all-digital phased-locked loop (PLL) control system.

The first baseband down-conversion circuit 114 is configured to reflect a quadrature (Q) pre-transmit component $\mathbf{104'}_{Tx\_Q}$ of the pre-transmit signal 104', and to provide a first plurality of baseband signals $\mathbf{160}_{1:N}$ in response to an in-phase (I) receive component $\mathbf{108}_{Rx\_I}$ of the receive signal 108, the first shared bias current 156, and the plurality of phase-shifted sinusoidal voltage signals 150$_{1:N}$. The second baseband down-conversion circuit 116 is configured to reflect an I pre-transmit component 104'$_{Tx\_I}$ of the pre-transmit signal 104', and provide a second plurality of baseband signals 162$_{1:N}$ in response to a Q receive component 108$_{Rx\_Q}$ of the receive signal 108, the second shared bias current 158, and the plurality of phase-shifted sinusoidal voltage signals 150$_{1:N}$. The quadrature hybrid coupler 110 is configured to provide the transmit signal 108 in response to the reflected quadrature pre-transmit component 104'$_{Tx\_Q}$ and the reflected in-phase pre-transmit component 104'$_{Tx\_I}$. According to an embodiment, the quadrature hybrid coupler 110 may be configured to a) power split the pre-transmit signal 104' into the Q pre-transmit component 104'$_{Tx\_Q}$ routed to the third port 128 and the I pre-transmit component 104$_{Tx\_I}$ routed to the fourth port 130; b) power split the receive signal 108 into the I receive component 108$_{Rx\_I}$ routed to the third port 128 and the Q receive component 108$_{Rx\_Q}$ routed to the fourth port 130; and c) provide the transmit signal 104 at the first port 124 by combining the reflected Q pre-transmit component 104'$_{Tx\_Q}$ from the third port 128 and the reflected I pre-transmit component 104'$_{Tx\_I}$ from the fourth port 130.

According to another aspect illustrated in FIGS. 1A-1B, the first baseband down-conversion circuit 114 includes the first shared current source 138; the first plurality of mixer transistors 140$_{1:N}$ coupled to the third port 128 and to the first shared current source 138; and the first plurality of low pass filters 142$_{1:N}$ coupled to the first plurality of mixer transistors 140$_{1:N}$. The second baseband down-conversion circuit 116 includes the second shared current source 144; the second plurality of mixer transistors 146$_{1:N}$ coupled to the fourth port 130 and to the second shared current source 144; and the second plurality of low pass filters 148$_{1:N}$ coupled to the second plurality of mixer transistors 146$_{1:N}$. The first shared current source 138 is configured to cyclically steer the first shared bias current 156 from the DC voltage supply at the DC voltage supply rail 120 in response to a time varying amplitude $V_{g\_n}(t)$ of each phase-shifted sinusoidal voltage signal 150$_n$, in the plurality of phase-shifted sinusoidal voltage signals 150$_{1:N}$, to commutate between the first plurality of mixer transistors 140$_{1:N}$. The second shared current source 144 is configured to cyclically steer the second shared bias current 158 from the DC voltage supply at the DC voltage supply rail 120 in response to the time varying amplitude $V_{g\_n}(t)$ of each phase-shifted sinusoidal voltage signal 150$_n$, in the plurality of phase-shifted sinusoidal voltage signals 150$_{1:N}$, to commutate between the second plurality of mixer transistors 146$_{1:N}$. The first plurality of low pass filters 142$_{1:N}$ is configured to reflect the Q pre-transmit component 104'$_{Tx\_Q}$ of the pre-transmit signal 104' and provide the first plurality of baseband signals 160$_{1:N}$ having the I receive component 108$_{Rx\_I}$. The second plurality of low pass filters 148$_{1:N}$ is configured to reflect the I pre-transmit component 104'$_{Tx\_I}$ of the pre-transmit signal 104' and provide the second plurality of baseband signals 162$_{1:N}$ having the Q receive component 108$_{Rx\_Q}$ of the receive signal 108.

Referring to FIG. 1B, each mixer transistor 140$_n$ in the first plurality of mixer transistors 140$_{1:N}$ has a gate coupled to the LO sinusoidal signal generator 118, a source coupled to the third port 128 and to the first end of the first shared current source 138, and a drain coupled to a corresponding one of the low pass filters 142$_n$ in the first plurality of low pass filters 148$_{1:N}$. Each mixer transistor 146$_n$ in the second plurality of mixer transistors 146$_{1:N}$ has a gate coupled to the LO sinusoidal signal generator 118, a source coupled to the fourth port 130 and to the first end of the second shared current source 144, and a drain coupled to a corresponding one of the low pass filters 148$_n$ in the second plurality of low pass filters 148$_{1:N}$.

The first plurality of mixer transistors 140$_{1:N}$ is configured to provide a first plurality of mixed signals 141$_{1:N}$ having the I receive component 108$_{Rx\_I}$ of the receive signal 108 in response to the first shared bias current 156 and the time varying amplitude $V_{g\_n}(t)$ of each phase-shifted sinusoidal voltage signal 150$_n$ in the plurality of phase-shifted sinusoidal voltage signals 150$_{1:N}$. The second plurality of mixer transistors 146$_{1:N}$ is configured to provide a second plurality of mixed signals 147$_{1:N}$ having the Q receive component 108$_{Rx\_Q}$ of the receive signal 108 in response to the second shared bias current 158 and the time varying amplitude $V_{g\_n}(t)$ of each phase-shifted sinusoidal voltage signal 150$_n$ in the plurality of phase-shifted sinusoidal voltage signals 150$_{1:N}$.

The first plurality of low pass filters 142$_{1:N}$ is configured to generate the first plurality of baseband signals 160$_{1:N}$ in response to the first plurality of mixed signals 141$_{1:N}$. The drain of each mixer transistor 140$_n$ in the first plurality of mixer transistors 140$_{1:N}$ is coupled to a corresponding low pass filter 142$_n$ in the first plurality low pass filters 142$_{1:N}$. The second plurality of low pass filters 148$_{1:N}$ is configured to generate the second plurality of baseband signals 162$_{1:N}$ in response to the second plurality of mixed signals 147$_{1:N}$. The drain of each mixer transistor 146$_n$ in the second plurality of mixer transistors 146$_{1:N}$ is coupled to a corresponding low pass filter 148$_n$ in the second plurality low pass filters 148$_{1:N}$.

According to an embodiment, a transmission line between the antenna 106 and each low pass filter 142$_n$ and each low pass filter 148$_n$ has a characteristic impedance such as 500. For example, the first port 124 of the quadrature hybrid coupler 110 has an input impedance of 500. Each low pass filter 142$_n$ and each low pass filter 148$_n$ includes a filter load having a receiver load impedance at the receive frequency and a transmitter load impedance at the transmit frequency. The receiver load impedance substantially matches the input impedance to pass the in-phase receive component 108$_{Rx\_I}$ and the quadrature receive component 108$_{Rx\_Q}$. Also, the transmitter load impedance substantially mismatches the input impedance to reflect the quadrature pre-transmit component 104'$_{Tx\_Q}$ and the in-phase pre-transmit component 104'$_{Tx\_I}$.

The first baseband down-conversion circuit 114 may include a first plurality of drain supply loads 170$_{1:N}$ according to an embodiment illustrated in FIG. 1B. Each drain supply load 170$_n$ is coupled between the DC voltage supply rail 120 and the drain of a corresponding mixer transistor 140$_n$ in the first plurality of mixer transistors 140$_{1:N}$. The second baseband down-conversion circuit 116 may include a second plurality of drain supply loads 172$_{1:N}$. Each drain supply load 172$_n$ is coupled between the DC voltage supply rail 120 and the drain of a corresponding mixer transistor 146$_n$ in the second plurality of mixer transistors 146$_{1:N}$.

Referring to FIG. 1A, the frequency division duplex transceiver 102 may include a combiner 164 configured to provide a combined baseband receive signal 166 in response to the first plurality of baseband signals 160$_{1:N}$ and the second plurality of baseband signals 162$_{1:N}$, according to an embodiment. A baseband analog-to-digital converter (ADC) 168 converts the combined baseband receive signal 166 to a digital signal suitable for digital signal processing applications. According to an embodiment, the combiner 164 may include polyphase filters, baluns, and a power combiner that may be arranged in any order to combine the first and second plurality of baseband signals 160$_{1:N}$ and 162$_{1:N}$ such that a combined baseband receive signal 166 in a baseband receiver path 165 is provided to the ADC 168 and pre-transmit leakage components are cancelled or suppressed from propagating in the baseband receiver path 165 according to an embodiment. Alternatively, first and second poly-phase filters may be respectively coupled between the combiner 164 (configured with baluns and a power combiner) and the first and second baseband loads (142, 148) according to an embodiment.

According to an embodiment, the first plurality of baseband signals 161$_{1:N}$ includes a first plurality of receive components associated with the I receive component 108$_{Rx\_I}$ and a first plurality of pre-transmit leakage components associated with the Q pre-transmit component 104$_{Tx\_Q}$. The second plurality of baseband signals 162$_{1:N}$ includes a second plurality of receive components associated with the Q receive component 108$_{Rx\_Q}$ of the receive signal 108 and a second plurality of pre-transmit leakage components associated with the I pre-transmit component 104$_{Tx\_I}$ of the pre-transmit signal 104. The combiner 164 may be configured to provide the combined baseband receive signal 166 to the ADC 168 in response to the first plurality of receive components and the second plurality of receive components; and suppress the first plurality of pre-transmit leakage components and the second plurality of pre-transmit leakage components from propagating into the baseband receiver path 165.

Figure 1C:
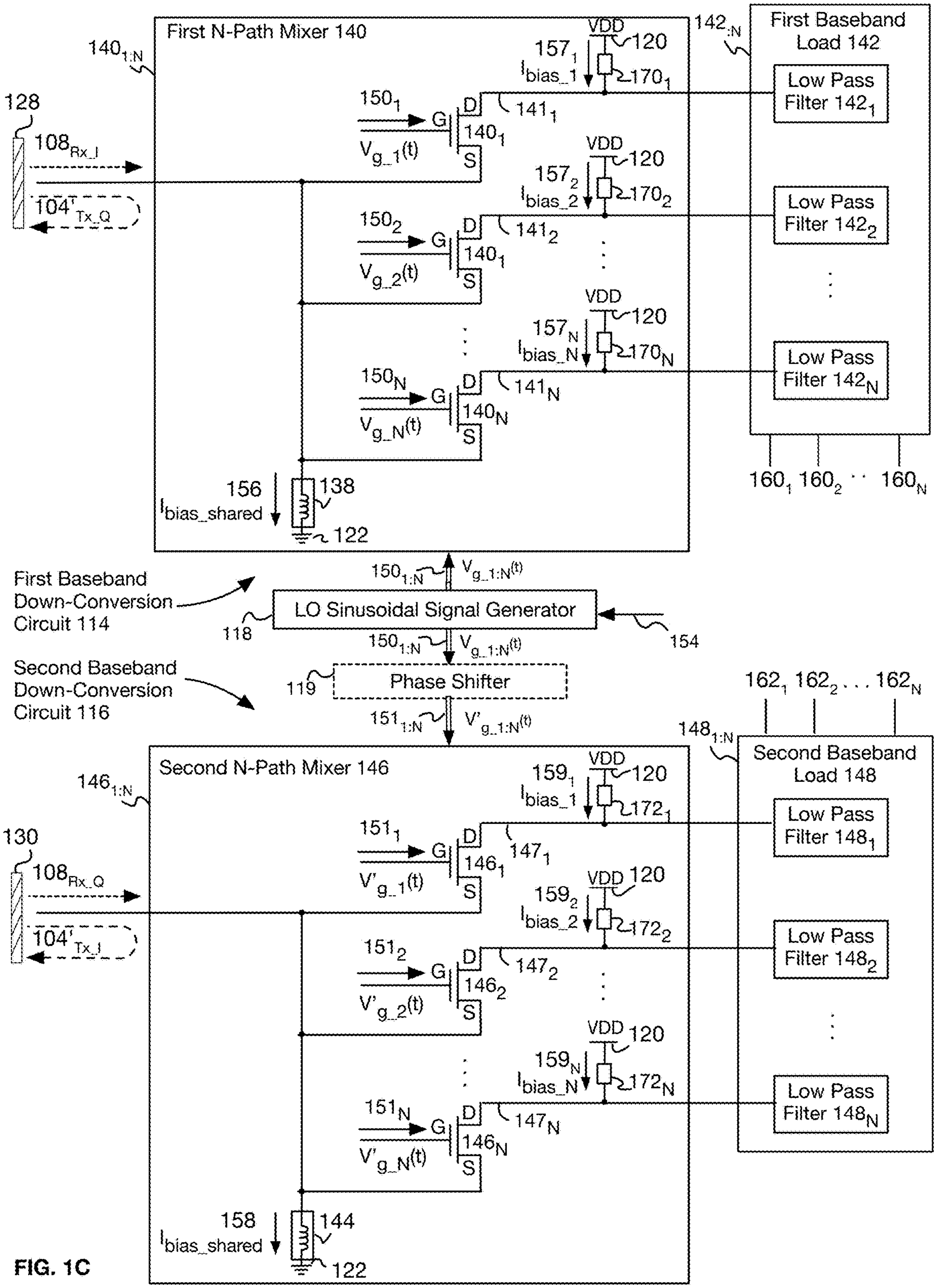
FIG. 1C is a diagram illustrating a configuration of N-path mixers and baseband loads which is similar to the configuration of the N-path mixers and the baseband loads shown in FIG. 1B, except that a phase shifter is coupled to one of the N-path mixers to control the phase relationship of signal components in baseband signals at the output of the baseband loads according to an embodiment.

FIG. 1C is a diagram illustrating a configuration of the first and second N-path mixers 140, 146 which is similar to the configuration of the first and second N-path mixers 140, 146 shown in FIG. 1B, except that a phase shifter 119 is coupled between the LO sinusoidal signal generator 118 and the second N-path mixer 146 according to an embodiment. The phase shifter 119 may be configured to control the phase relationship of signal components in the first and second plurality of baseband signals (160$_{1:N}$, 162$_{1:N}$) at the output of the first and second baseband loads 142, 148 respectively. According to an embodiment, the plurality of phase-shifted sinusoidal voltage signals 150$_{1:N}$ from the LO sinusoidal signal generator 118 may be configured as a first plurality of phase-shifted sinusoidal voltage signals 150$_{1:N}$, and the phase shifter 119 may be configured to rearrange the first plurality of phase-shifted sinusoidal signal voltage signals 150$_{1:N}$ into a second plurality of phase-shifted sinusoidal voltage signals 151$_{1:N}$.

According to an embodiment, the phase shifter 119 may be configured as a negative phase shifter to add a −90° phase shift in the second plurality of phase-shifted sinusoidal signals 151$_{1:N}$ such that receive components in the first and second plurality of baseband signals (160$_{1:N}$, 162$_{1:N}$) respectively are in-phase (aligned with no phase shift); and pre-transmit leakage components in the first and second plurality of baseband signals (160$_{1:N}$, 162$_{1:N}$) respectively have an anti-phase relationship (180° phase shift). In an embodiment of the negative phase shifter 119, the combiner 164 illustrated in FIG. 1A may be configured as a summing combiner to a) provide the combined baseband receive signal 166 to the ADC 168 in response to the receive components having an in-phase relationship in the first and second plurality of baseband signals (160$_{1:N}$, 162$_{1:N}$); and b) cancel or suppress pre-transmit leakage components in the receive path 165 in response to the pre-transmit leakage components having an anti-phase relationship in the first and second plurality of baseband signals (160$_{1:N}$ and 162$_{1:N}$) respectively.

Each phase-shifted sinusoidal voltage signal in the second plurality of phase-shifted sinusoidal voltage signals 151$_{1:N}$ is a) −90° phase-shifted from the first plurality of phase-shifted sinusoidal signal voltage signals 150$_{1:N}$; and b) routed to the gate of a corresponding one of the second plurality of mixer transistors 146$_{1:N}$. Also, the second plurality of phase-shifted sinusoidal voltage signals 151$_{1:N}$ have a time varying voltage $V'_{g\_n}(t)$ that is substantially equal to and −90° phase-shifted from the time varying voltage $V_{g\_n}(t)$ of the first plurality of phase-sinusoidal signal voltage signals 150$_{1:N}$.

In response to the Q receive component 108$_{Rx\_Q}$ and the second plurality of phase-shifted sinusoidal voltage signals 151$_{1:N}$, the second plurality of mixer transistors 146$_{1:N}$ provides the second plurality of mixed signals 147$_{1:N}$ having the Q receive component 108$_{Rx\_Q}$ that is aligned (in-phase) with the I receive component 108$_{Rx\_I}$ in the first plurality of mixed signals 141$_{1:N}$. Also, in response to the second plurality of mixed signals 147$_{1:N}$, the second plurality of low pass filters 148$_{1:N}$ provides the second plurality of baseband signals 162$_{1:N}$ having a baseband of the Q receive component 108$_{Rx\_Q}$ that is aligned (in-phase) with the baseband of the I receive component 108$_{Rx\_I}$ in the first plurality of baseband signals 160$_{1:N}$.

According to an embodiment, the phase shifter 119 may be configured as a signal permutator such that the first plurality of phase-shifted sinusoid phase signals 150$_{1:N}$ are represented by a signal column vector $V(t)=[V_1(t) \ldots V_N(t)]$. The signal permutator may be configured to create a permutated signal column vector $V(t)'=[V'_1(t) \ldots V'_N(t)]$ that represents the second plurality of phase-shifted sinusoidal voltage signals 151$_{1:N}$. The permutated signal column vector V'(t) may be given by the equation V'(t)=PV(t), where P is an N×N permutation matrix having entries that are equal to 1 or 0, and the $n^{th}$ component of the permutated signal column vector V'(t) is phase-shifted with respect to the $n^{th}$ component of the signal column vector V(t). For an embodiment of N=4 and V'(t) is −90° phase-shifted, P is given by then N×N permutation matrix:

$$P = \begin{matrix} 0 & 1 & 0 & 0 \\ 0 & 0 & 1 & 0 \\ 0 & 0 & 0 & 1 \\ 1 & 0 & 0 & 0 \end{matrix}$$

For the embodiment where N=4 and V'(t) is −90° phase-shifted, the signal permutator rearranges the first plurality of phase-shifted sinusoidal signal voltage signals 150$_1$, 150$_2$, 150$_3$, and 150$_4$ into a rearranged plurality of phase-shifted sinusoidal voltage signals 150$_2$, 150$_3$, 150$_4$, and 150$_1$ that correspond to a second plurality of phase-shifted sinusoidal voltage signals 151$_1$, 151$_2$, 151$_3$, and 151$_4$ as illustrated in FIG. 1C.

According to another embodiment, the phase shifter 119 may be configured as a positive phase shifter that adds a +90° phase shift in the second plurality of phase-shifted sinusoidal signals 151$_{1:N}$ such that receive components in the first and second plurality of baseband signals 160$_{1:N}$, 162$_{1:N}$ respectively are 180° phase-shifted; and pre-transmit leakage components in the first and second plurality of baseband signals 160$_{1:N}$, 162$_{1:N}$ respectively have an in-phase relationship. In an embodiment of the positive phase shifter 119, the combiner 164 illustrated in FIG. 1A may be configured as a differential combiner to a) provide the combined baseband receive signal 166 to the ADC 168 in response to the receive components in the first and second plurality of baseband signals $160_{1:N}$, $162_{1:N}$ respectively; and b) cancel or suppress pre-transmit leakage components in the baseband receiver path 165 in response to the in-phase relationship of the pre-transmit leakage components in the first and second plurality of baseband signals ($160_{1:N}$, $162_{1:N}$).

Alternatively, the phase shifter 119 may be coupled at other circuit points in the first and second baseband down conversion circuits (114, 116) or in the combiner 164 to control the phase relationship of signal components in the first and second plurality of baseband signals ($160_{1:N}$, $162_{1:N}$).

Figure 2A:
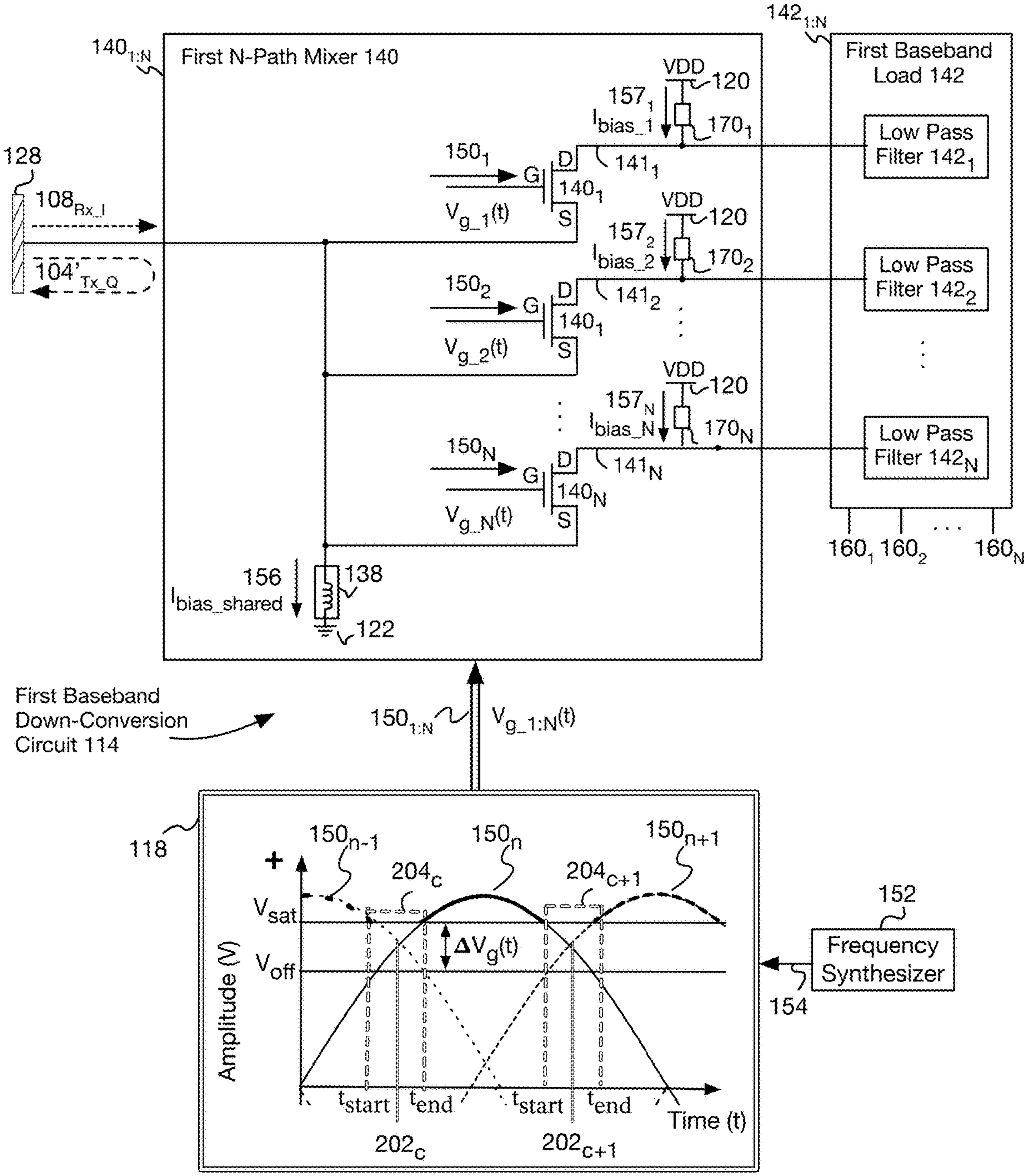
FIGS. 2A-2B are diagrams illustrating bias current steering and sinusoidal voltage gate drivers from a local oscillator (LO) sinusoidal signal generator for commutating transistors in first and second N-path mixers respectively in the first and second baseband down-conversion circuits of FIG. 1C according to an embodiment.
Figure 2B:
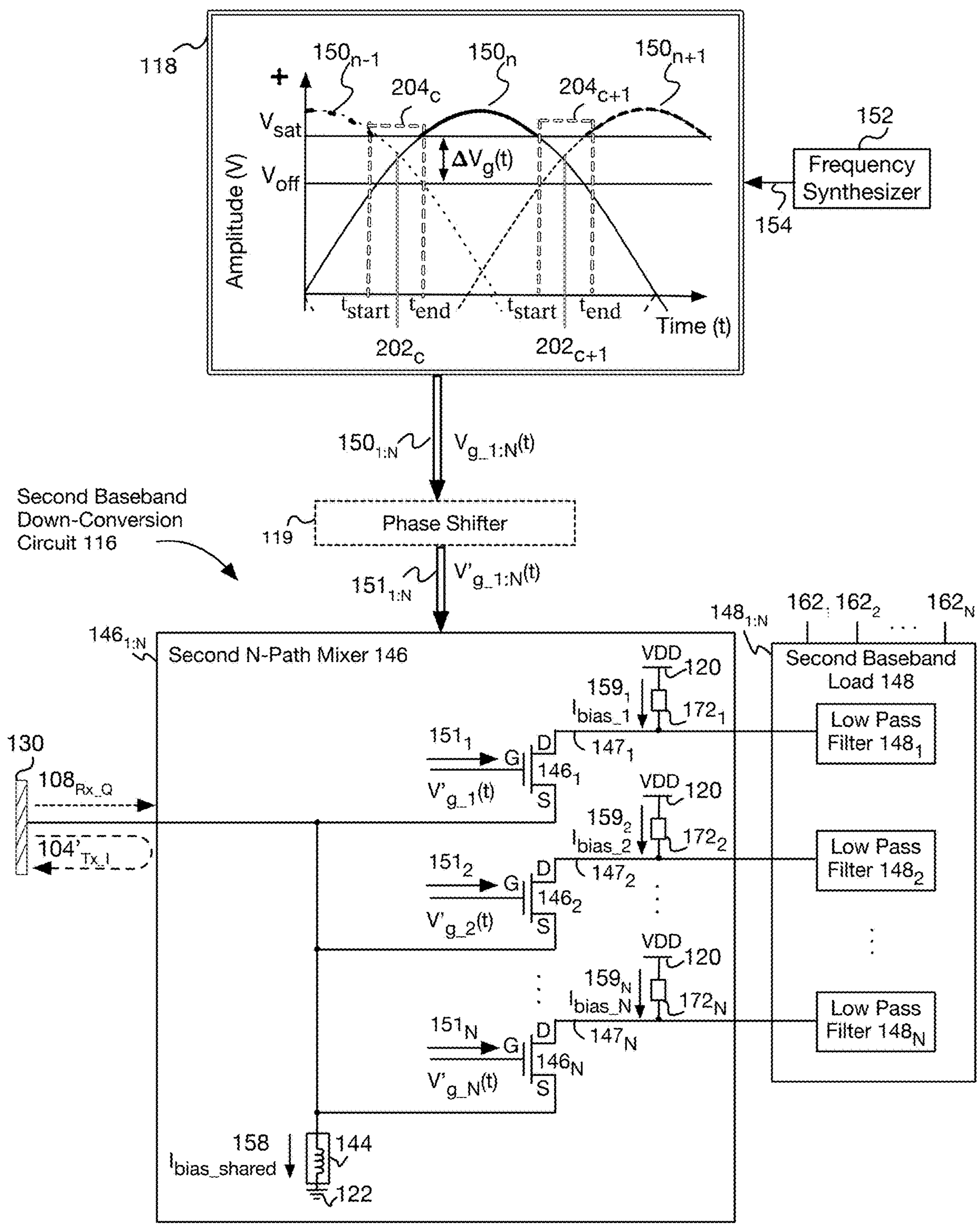

FIGS. 2A-2B are diagrams illustrating bias current steering and sinusoidal voltage gate drivers from the LO sinusoidal signal generator 118 for commutating the first plurality of mixer transistors $140_{1:N}$ in the first N-path mixer 140 of FIG. 2A, and the second plurality of mixer transistors $146_{1:N}$ in the second N-path mixer 146 of FIG. 2B. The LO sinusoidal signal generator 118 provides the plurality of phase-shifted sinusoidal voltage signals $150_{1:N}$ as sinusoidal voltage gate drivers associated with the gates of the first plurality of mixer transistors $140_{1:N}$ as shown in FIG. 2A, and the gates of the second plurality of mixer transistors $146_{1:N}$ as shown in FIG. 2B.

The plurality of phase-shifted sinusoidal voltage signals $150_{1:N}$ includes a plurality of periodic sinusoidal intersections $202_{1:C}$ that determines a plurality of periodic commutation transition periods $204_{1:C}$. Each sinusoidal intersection $202_c$ determines a commutation transition period $204_c$ for a) switching between the mixer transistor $140_n$ in a current baseband down-conversion path to the mixer transistor $140_{n+1}$ in a next baseband down-conversion path of the first baseband down-conversion circuit 114 in FIG. 2A; and b) switching between the mixer transistor $146_n$ in a current baseband down-conversion path to the mixer transistor $146_{n+1}$ in a next baseband down-conversion path of the second baseband down-conversion circuit 116 in FIG. 2B. The duration of the commutation transition period $204_c$ may be configured to control noise figure and performance characteristics of the frequency division duplex transceiver 102 according to embodiments.

For example, the commutation transition period $204_c$ includes a transition start time $t_{start}$ and a transition end time $t_{end}$. During the commutation transition period $204_c$, the mixer transistor $140_n$ in the current baseband down-conversion path and the mixer transistor $140_{n+1}$ in the next baseband down-conversion path of the first baseband down-conversion circuit 114 in FIG. 2A each operate in a triode mode. Also, the mixer transistor $146_n$ in the current baseband down-conversion path and the mixer transistor $146_{n+1}$ in the next baseband down-conversion path of the second baseband down-conversion circuit 116 in FIG. 2B each operate in a triode mode. By the transition end time $t_{end}$:

1. The mixer transistor $140_n$ in the first N-path mixer 140 of FIG. 2A and the mixer transistor $146_n$ in the second N-path mixer 146 of FIG. 2B each switch from operating in its triode mode to a cut-off mode when the time varying amplitude $V_{g\_n}(t)$ of the phase-shifted sinusoidal voltage signal $150_n$ is below a cut-off mode voltage threshold $V_{off}$.
2. The mixer transistor $140_{n+1}$ in the first N-path mixer 140 of FIG. 2A and the mixer transistor $146_{n+1}$ in the second N-path mixer 146 of FIG. 2B each switch from operating in its triode mode to its saturation mode when the phase-shifted sinusoidal voltage signal $150_{n+1}$ is above a saturation mode voltage threshold $V_{sat}$.

The difference between the saturation mode voltage threshold $V_{sat}$ and the cut-off mode voltage threshold $V_{off}$ determines the duration of the commutation transition period $204_c$ according to an embodiment. Also, the difference between the saturation mode voltage threshold V sat and the cut-off mode voltage threshold $V_{off}$ may be configured to a) steer substantially all of the first shared bias current 156 to the mixer transistor $140_{n+1}$ in the next baseband down-conversion path the first baseband down-conversion circuit 114 in FIG. 2A; and b) steer substantially all of the second shared bias current 158 to the mixer transistor $146_{n+1}$ in the next baseband down-conversion path of the next baseband down-conversion circuit 116 in FIG. 2B by the end of the transition time $t_{end}$.

Accordingly, substantially all of the first shared bias current 156 $I_{bias\_shared}$ is steered as a first bias current 157 $I_{bias\_n+1}$ to the mixer transistor $140_{n+1}$ in the first N-path mixer 140 of FIG. 2A and substantially all of the second shared bias current 158 $I_{bias\_shared}$ is steered as a second bias current 159 $I_{bias\_n+1}$ to the mixer transistor $146_{n+1}$ in the second N-path mixer 146 of FIG. 2B when the time varying amplitude $V_{g\_n+1}(t)$ of the phase-shifted sinusoidal voltage signal $150_{n+1}$ associated with the gate of the mixer transistor $140_{n+1}$ and the gate of the mixer transistor $146_{n+1}$ is above the saturation mode voltage threshold $V_{sat}$.

Figure 3:
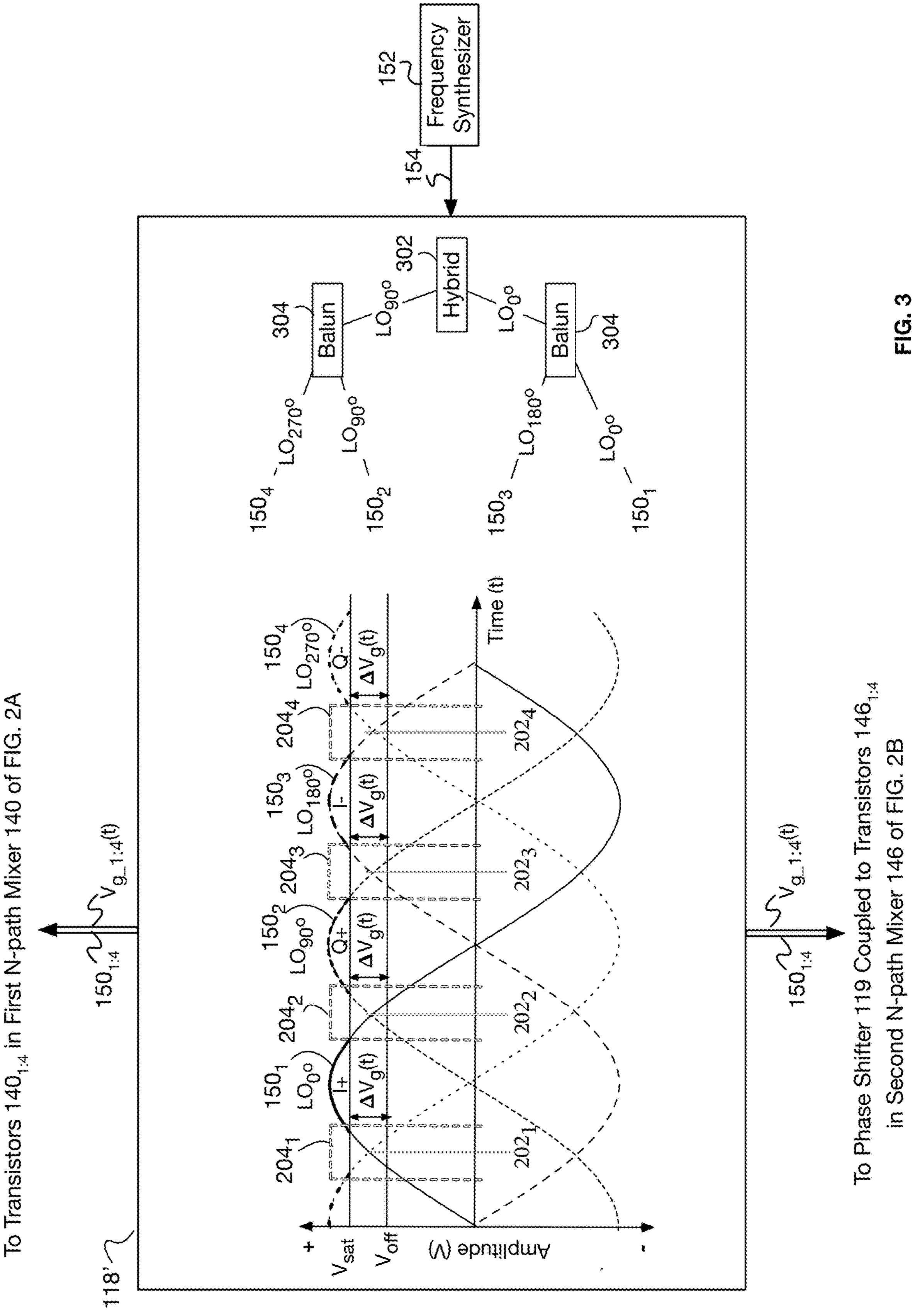
FIG. 3 is a diagram illustrating an LO sinusoidal signal generator that is substantially the same as the LO sinusoidal signal generator of FIGS. 2A-2B, except that the LO sinusoidal signal generator of FIG. 3 is configured for N=4 paths according to an embodiment.

FIG. 3 illustrates an LO sinusoidal signal generator 118' configured substantially the same as the LO sinusoidal signal generator 118 of FIGS. 2A-2B, except that the LO sinusoidal signal generator 118' is configured for N=4 paths. The LO sinusoidal signal generator 118' generates a plurality of phase-shifted sinusoidal voltage signals $150_{1:4}$ having a plurality of periodic sinusoidal intersections $202_{1:4}$ that determines a plurality of periodic commutation transition periods $204_{1:4}$. The plurality of phase-shifted sinusoidal voltage signals $150_{1:4}$ is provided to a first plurality of mixer transistors $140_{1:4}$ according to an embodiment of the first N-path mixer 140 in FIG. 2A, and to a plurality of second mixer transistors $146_{1:4}$ according to an embodiment of the second N-path mixer 146 in FIG. 2B. The LO sinusoidal signal generator 118' may be configured with wideband quadrature hybrid 302 and subsequent baluns 304 to split the single-ended sinusoidal voltage signal 154 into the phase-shifted sinusoidal voltage signals $150_1$ to $150_4$ that are phase and amplitude balanced signals.

Figure 4:
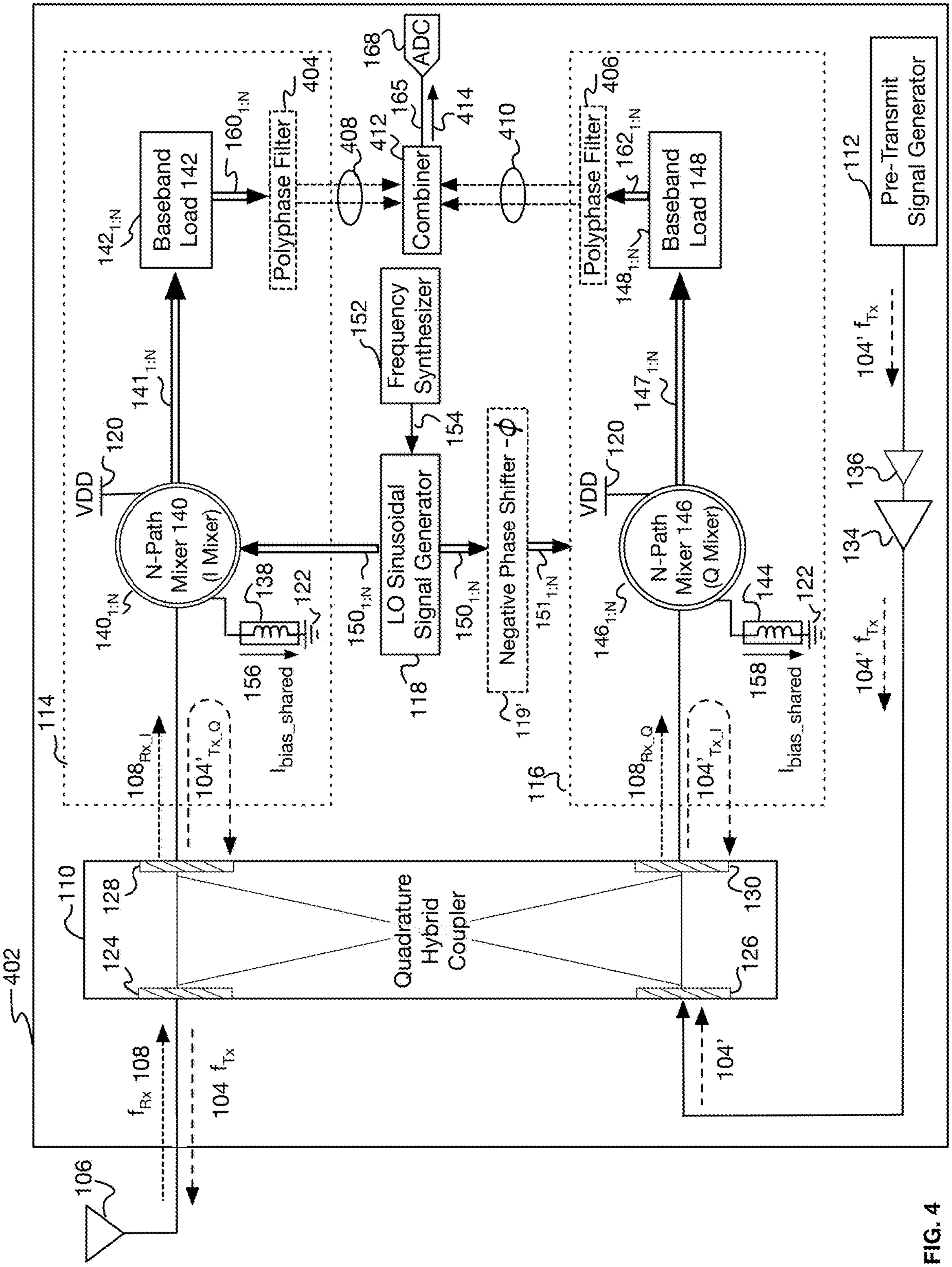
FIG. 4 is a diagram illustrating a frequency division duplex transceiver that is substantially the same as the frequency division duplex transceiver of FIG. 1, except that the frequency division duplex transceiver of FIG. 4 includes first and second polyphase filters coupled at the output of first and second baseband loads respectively, and a negative phase shifter coupled to one of the N-path mixers according to an embodiment.

FIG. 4 is a diagram illustrating a frequency division duplex transceiver 402 that is substantially the same as the frequency division duplex transceiver 102 of FIG. 1, except that the frequency division duplex transceiver 402 includes a negative phase shifter 119'; a first polyphase filter 404 coupled between the first plurality of low pass filters $142_{1:N}$ (first baseband load 142) and a combiner 412; and a second polyphase filter 406 coupled between the second plurality of low pass filters $148_{1:N}$ (second baseband load 148) and the combiner 412 according to an embodiment. The first polyphase filter 404 may be configured to recombine components of the first plurality of baseband signals $160_{1:N}$ into a first pair of differential baseband signals 408, and the second polyphase filter 406 may be configured to recombine components of the second plurality of baseband signals $162_{1:N}$ into a second pair of differential baseband signals 410. According to an embodiment, the combiner 412 may include a first balun, a second balun, and a power combiner. The first balun may be coupled to the first pair of differential baseband signals 408 from the first polyphase filter 404 to provide a first single-ended baseband signal. The second balun may be coupled to the second pair of differential baseband signals 410 from the second polyphase filter 406 to provide a second single-ended baseband signal. The power combiner may be configured to combine the first and second single-ended baseband signals from the first and second baluns respectively to a) provide a combined baseband receive signal 414 to the baseband ADC 168; and b) cancel or suppress pre-transmit leakage components from propagating into the baseband receiver path 165.

Figure 5:
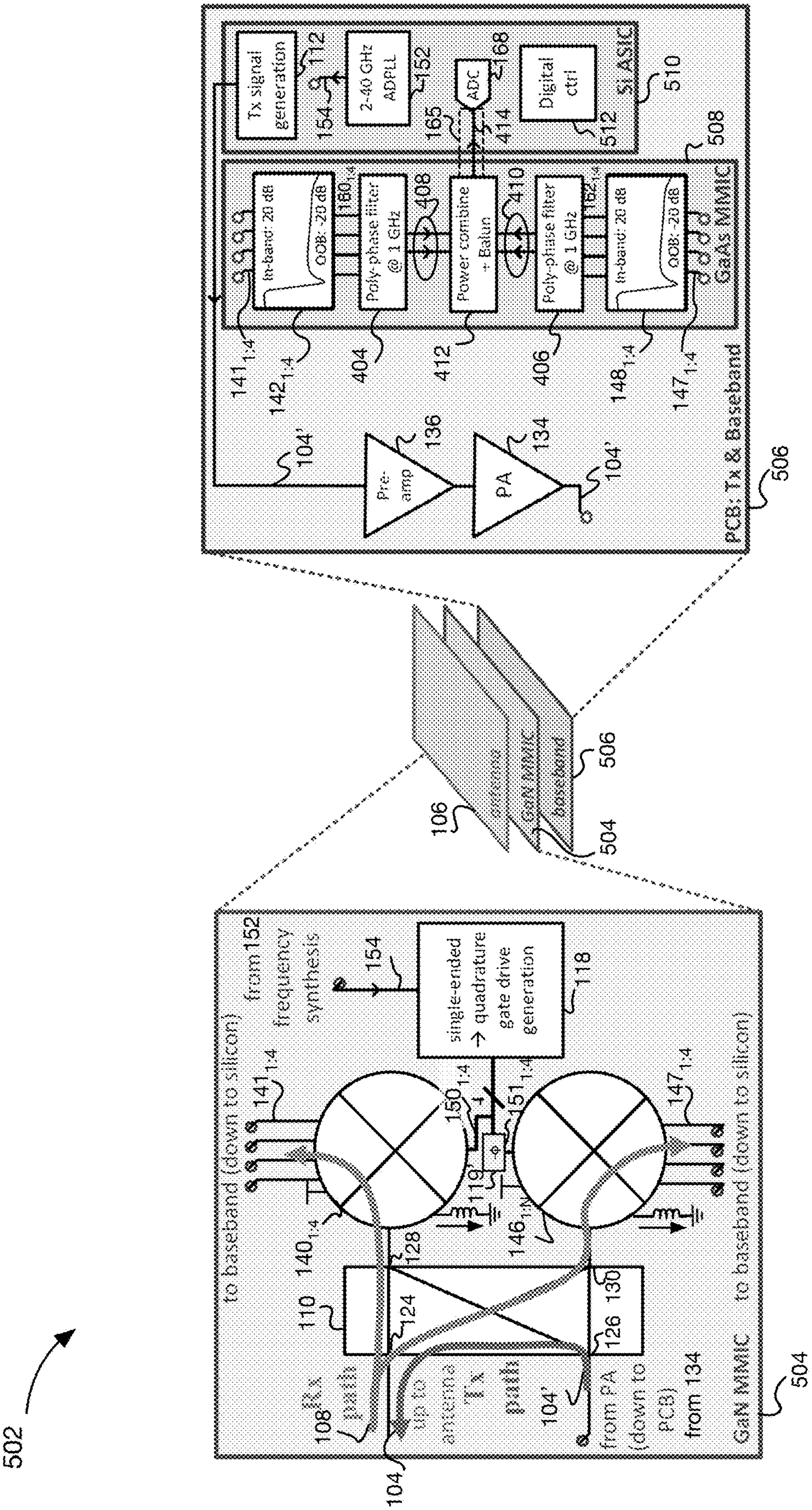
FIG. 5 is a diagram illustrating the frequency division duplex transceiver of FIG. 4 where the N-path mixers and the baseband loads are configured for N=4, and the transceiver architecture is partitioned with frontend and backend modules according to an embodiment.

FIG. 5 is a diagram illustrating a frequency division duplex transceiver 502 that is substantially similar to the frequency division duplex transceiver 402 of FIG. 4, except that the first baseband down-conversion circuit 114, the second baseband down-conversion circuit 116, and the LO sinusoidal signal generator 118 are configured for N=4 paths. Also the architecture of the frequency division duplex transceiver 502 is partitioned with a frontend module 504 and a backend module 506 according to an embodiment.

The frontend module 504 is configured as a monolithic microwave integrated circuit (MMIC) fabricated on a gallium nitride (GaN) material, and includes the quadrature hybrid coupler 110, the first plurality of mixer transistors $\mathbf{140}_{1:4}$, the second plurality of mixer transistors $\mathbf{146}_{1:4}$, and the LO sinusoidal signal generator 118. The backend module 506 includes a baseband conversion module 508 configured as a MMIC fabricated on gallium arsenide (GaAs) material, and a backend silicon integrated circuit (Si ASIC) module 510. The GaAs MMIC baseband conversion module 508 may include the first plurality of low pass filters $\mathbf{142}_{1:4}$ and the second plurality of low pass filters $\mathbf{148}_{1:4}$, first polyphase filter 404, the second polyphase filter 406, and the combiner 412 such as a differential combiner. The Si ASIC backend module 510 may include the pre-transmit signal generator 112, the pre-amplifier 136, and the power amplifier 134 that provide the pre-transmit signal 104'. Also, the Si ASIC backend module 510 may include the frequency synthesizer 152 such as a 2-40 GHz All Digital Phase-Locked Loop (ADPLL), the baseband ADC 162, and a digital controller 512 that may provide control signals such as automatic gain control in the frequency division duplex transceiver 502.

The architecture illustrated in the frequency division duplex transceiver 502 is based on the phase relationship between the transmit and receive signal paths that depend on the impedance presented by the baseband loads. For example, the transmit signal 104 can be delivered to the antenna 106 when the baseband loads present low impedance to reflect the I and Q components of the pre-transmit signal 104'. The pre-transmit leakage components can be cancelled or suppressed in the receive path such as the baseband receive path 165 using the anti-phase relationship of the pre-transmit leakage components. Also, the baseband loads present ~50 ohm impedance in-band to pass the I and Q components of the receive signal 108. According to an embodiment, the simultaneous transmit and receiver paths in the frequency division duplex transceiver 502 may be configured for frequency division duplex application where 65+ dBm of pre-transmit signal 104' leakage cancellation enables 100 dB dynamic range at the antenna 106 with 30 dBm pre-transmit signal 104' operating concurrently and out-of-band from −70 dBm receive signal 108 with 2 GHz instantaneous bandwidth. The disclosed embodiments may cover more than a decade (2-40 GHz) without calibration between the first and second N-path mixers (140, 146) and baseband loads (142, 148) because they have symmetric paths where wanted receive signal 108 adds and in phase and pre-transmit signal leakage arrives anti-phase and thus when combined is cancelled out. Suppression of a 30 dBm pre-transmit signal 104' signal may be suppressed by 40+dB beyond 2.5× instantaneous bandwidth of the passband sufficient to fall below the ADC input maximum. At the same time, in-band signals may be amplified by 20 dB bringing received signal above the ADC input minimum. In a transceiver system this allows for jamming assignments up to 30 dBm concurrently and out-of-band front listening assignments as weak as −70 dBm. If a 10 dBi 2-40 GHz Vivaldi antenna were included in the system up to 40 dBm of jammer power could be delivered without desensitizing the −70 dBm receiver. The disclosed embodiments may achieve transmit signal power up to 30 dBm in the GaN MMIC module 504, in a frequency range of 2-40 GHz, and transmit signal leakage cancellation jammer close in frequency.

Figure 6:
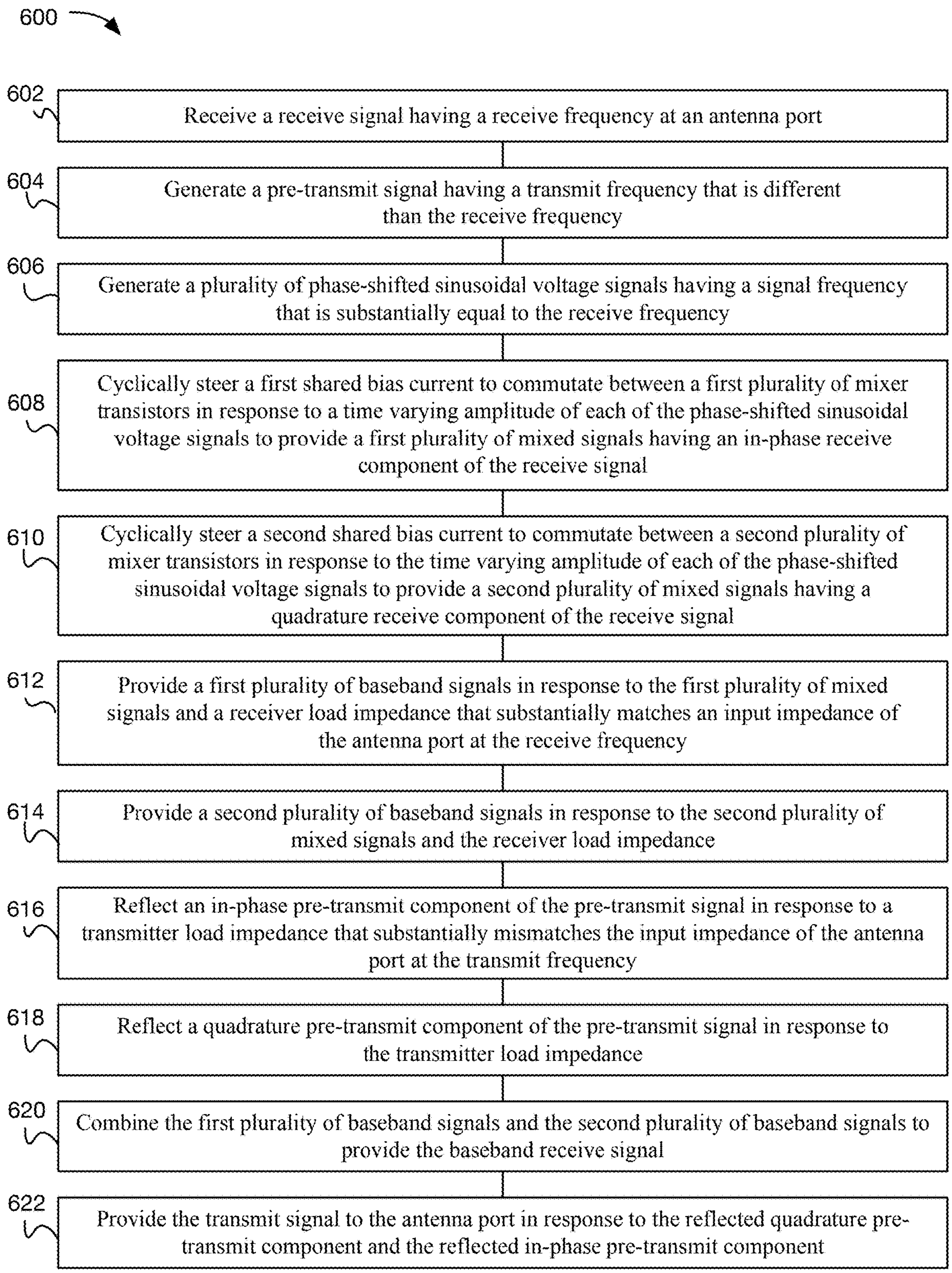
FIG. 6 is a diagram illustrating a method of providing a transmit signal and a baseband receive signal in a frequency division duplex transceiver according to an embodiment.

FIG. 6 illustrates a method 600 of providing a transmit signal and a baseband receive signal in a frequency division duplex transceiver according to an embodiment. Block 602 receives a receive signal having a receive frequency at an antenna port. Block 604 generates a pre-transmit signal having a transmit frequency that is different than the receive frequency, and block 606 generates a plurality of phase-shifted sinusoidal voltage signals having a signal frequency that is substantially equal to the receive frequency. Block 608 cyclically steers a first shared bias current to commutate between a first plurality of mixer transistors in response to a time varying amplitude of each of the phase-shifted sinusoidal voltage signals to provide a first plurality of mixed signals having an in-phase receive component of the receive signal. Block 610 cyclically steers a second shared bias current to commutate between a second plurality of mixer transistors in response to the time varying amplitude of each of the phase-shifted sinusoidal voltage signals to provide a second plurality of mixed signals having a quadrature receive component of the receive signal.

Block 612 provides a first plurality of baseband signals in response to the first plurality of mixed signals and a receiver load impedance that substantially matches an input impedance of the antenna port at the receive frequency, and block 614 provides a second plurality of baseband signals in response to the second plurality of mixed signals and the receiver load impedance. Block 616 reflects an in-phase pre-transmit component of the pre-transmit signal in response to a transmitter load impedance that substantially mismatches the input impedance of the antenna port at the transmit frequency, and block 618 reflects a quadrature pre-transmit component of the pre-transmit signal in response to the transmitter load impedance. Block 620 combines the first plurality of baseband signals and the second plurality of baseband signals to provide the baseband receive signal, and block 622 provides the transmit signal to the antenna port in response to the reflected quadrature pre-transmit component and the reflected in-phase pre-transmit component.

According to an embodiment, the method may include providing the in-phase receive component and the quadrature pre-transmit component to a quadrature hybrid coupler port that is coupled to a source of each mixer transistor in the first plurality of mixer transistors; and providing the quadrature receive component and the in-phase pre-transmit component to another quadrature hybrid coupler port that is coupled to a source of each mixer transistor in the second plurality of mixer transistors.

The method may include a) associating the first plurality of mixed signals with a first plurality of low pass filters having the receiver load impedance at the receive frequency to provide the first plurality of baseband signals and the transmitter load impedance at the transmit frequency to reflect the quadrature pre-transmit component of the pre-transmit signal; and b) associating the second plurality of mixed signals with a second plurality of low pass filters having the receiver load impedance at the receive frequency to provide the second plurality of baseband signals and the transmitter load impedance at the transmit frequency to reflect the in-phase pre-transmit component of the pre-transmit signal. Also, the method may include a) providing the first shared bias current to configure one of the mixer transistors in the first plurality of mixer transistors to operate in its saturation mode in response to the time varying amplitude of a corresponding one of the plurality of phase-shifted sinusoidal voltage signals that drives a gate of the one of the mixer transistors in the first plurality of mixer transistors; and b) providing the second shared bias current to configure one of the mixer transistors in the second plurality of mixer transistors to operate in its saturation mode in response to the time varying amplitude of a corresponding one of the plurality of phase-shifted sinusoidal voltage signals that drives a gate of the one of the mixer transistors in the second plurality of mixer transistors.

According to an embodiment, method may include a) steering substantially all of the first shared bias current to the one of the mixer transistors in the first plurality of mixer transistors when the instantaneous gate voltage from the time varying amplitude of the corresponding one of the plurality of phase-shifted sinusoidal voltage signals is above a saturation mode voltage threshold V sat; and b) steering substantially all of the second shared bias current to the one of the mixer transistors in the second plurality of mixer transistors when an instantaneous gate voltage from the time varying amplitude of the corresponding one of the plurality of phase-shifted sinusoidal voltage signals is above the saturation mode voltage threshold $V_{sat}$. The method may further include a) steering substantially all of the first shared bias current away from another one of the mixer transistors in the first plurality of mixer transistors when an instantaneous gate voltage from the time varying amplitude of a corresponding one of the plurality of phase-shifted sinusoidal voltage signals associated with the gate of the another one of the mixer transistors in the first plurality of mixer transistors is below a cut-off mode voltage threshold $V_{off}$; and b) steering substantially all of the second shared bias current away from another one of the mixer transistors in the second plurality of mixer transistors when the instantaneous gate voltage from the time varying amplitude of a corresponding one of the plurality of phase-shifted sinusoidal voltage signals associated with the gate of the another one of the mixer transistors in the second plurality of mixer transistors is below the cut-off mode voltage threshold $V_{off}$.

According to an embodiment, the plurality of phase-shifted sinusoidal voltage signals is a first plurality of phase-shifted sinusoidal voltage signals. The method may include a) rearranging the first plurality of phase-shifted sinusoidal voltage signals into a second plurality of phase-shifted sinusoidal voltage signals, wherein each phase-shifted sinusoidal voltage signal in the second plurality of phase-shifted sinusoidal voltage signals is phase-shifted such as −90° from a corresponding one of the first plurality of phase-shifted sinusoidal voltage signals; and b) routing each phase-shifted sinusoidal voltage signal in the second plurality of phase-shifted sinusoidal voltage signals to the gate of a corresponding one of the mixer transistors in the second plurality of mixer transistors. Alternatively, the method may include rearranging the second plurality of mixed signals to add a phase shift such as −90° in the second plurality of mixed signals that are provided to the second plurality of low pass filters. In other embodiments, the method may include rearranging the second plurality of baseband signals to add a phase shift such as +90° in the second plurality of baseband signals that may be combined with the first plurality of baseband signals to provide the baseband receive signal.

According to an embodiment, the method may include a) providing a combined baseband receive signal in response to a first plurality of receive components associated with the in-phase receive component of the receive signal and a second plurality of receive components associated the quadrature receive component of the receive signal; b) providing a baseband receiver path for the combined baseband receive signal; and c) suppressing pre-transmit signal leakage in the baseband receiver path in response to a first plurality of pre-transmit leakage components associated with the in-phase pre-transmit component of the pre-transmit signal and a second plurality of pre-transmit leakage components associated with the quadrature pre-transmit component of the pre-transmit signal.

Figure 7:
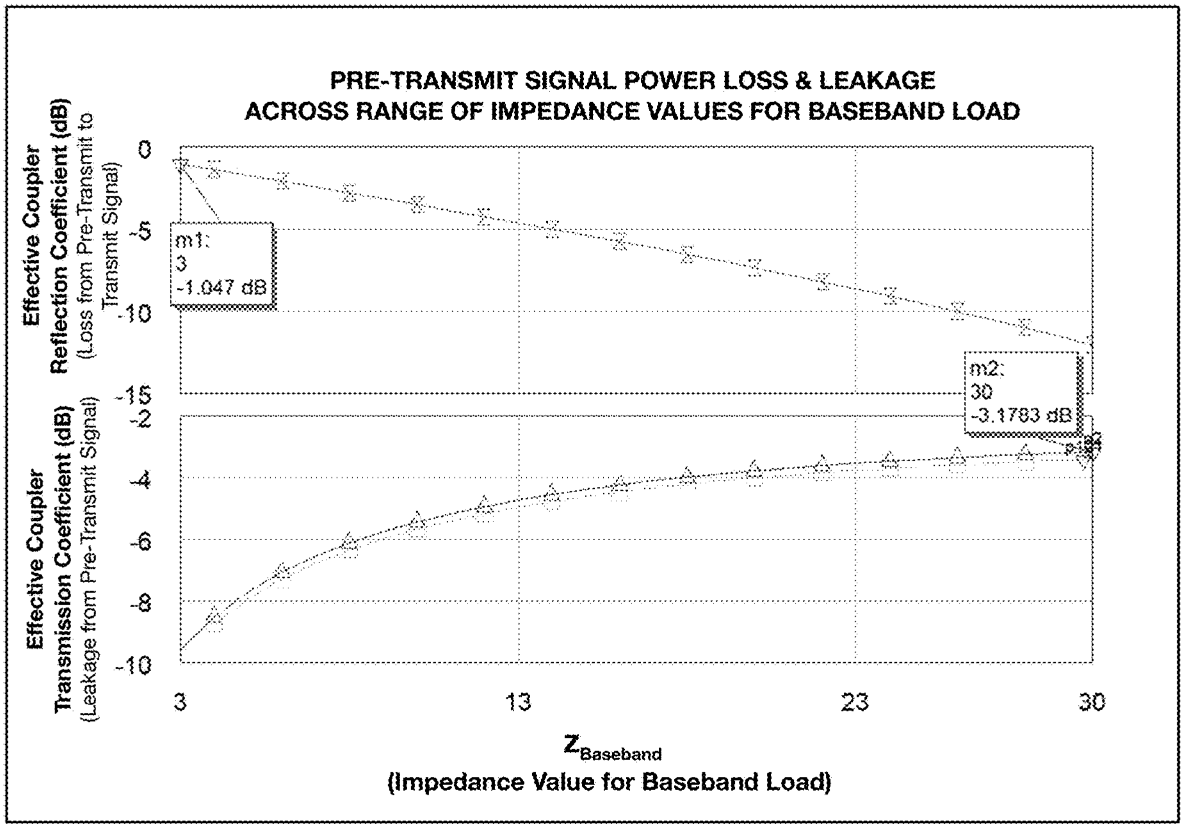
FIG. 7 shows simulation data for transmission signal loss and leakage when pre-transmit signal is reflected across range of impedance values for baseband loads according to an embodiment.

FIG. 7 shows simulation data for loss and leakage of pre-transmit signal 104' when reflected across a range of impedance values for the low pass filters in the first plurality of low pass filters $\mathbf{142}_{1:N}$ in the first baseband load 142 and the second plurality of low pass filters $\mathbf{148}_{1:N}$ in the second baseband load 148, according to an embodiment of the frequency division duplex transceiver 102 illustrated in FIGS. 1A-1B. The simulation data shows that when the impedance presented by each low pass filter ($Z_{NPF}$) in the first and second baseband loads is low (left side of plot in FIG. 7), then the pre-transmit signal 104' at the output of power amplifier 134 reflects from the through port such as the third port 128 and the coupled port such as the fourth port 130, and adds constructively at the antenna port such as the first port 124, according to an embodiment.

For an impedance value of $Z_{NPF}$=3Ω shown in FIG. 7, the loss of pre-transmit signal 104' from the power amplifier 134 to the first port 124, and consequently to the antenna 106, is about 1 dB and the pre-transmit signal 104' leaking into the first baseband down-conversion circuit 114 and the second baseband down-conversion circuit 116 is suppressed by about 10 dB. Conversely, if the impedance $Z_{NPF}$ presented by each low pass filter in the first plurality of low pass filters $\mathbf{142}_{1:N}$ and in the second plurality of low pass filters $\mathbf{148}_{1:N}$ is close to 50Ω (toward right side of FIG. 7), the I and Q receive components of the receive signal 108 from the antenna port such as the first port 124 propagates through first baseband down-conversion circuits 114 (such as the I receive component) and the second baseband down-conversion circuit 116 (such as the Q receive component), and approximately −3 dB from power split is delivered from the first port 124 to the first plurality of mixer transistors $\mathbf{140}_{1:N}$ in the first baseband down-conversion circuit 114 and the second plurality of and second mixer transistors $\mathbf{146}_{1:N}$ in the second baseband down-conversion circuit 116.

Regarding the receive signal 108, for an impedance of $Z_{Baseband}$=30Ω, the I and Q receive components of the receive signal 108 propagates through first baseband down-conversion circuits 114 (such as the I receive component) and the second baseband down-conversion circuit 116 (such as the Q receive component) with <0.5 dB loss in the combined baseband receive signal 166.

On the baseband at the output of the first plurality of low pass filters $\mathbf{142}_{1:N}$ in the first baseband load 142 and the second plurality of low pass filters $\mathbf{148}_{1:N}$ in the second baseband load 148, any baseband leakage from the pre-transmit signal 104' provided by the output of power amplifier 134 is out-of-band, and the power of the pre-transmit signal 104' may be reduced to avoid causing saturation in a baseband amplifier. According to an embodiment, each low pass filter in the first plurality of low pass filters $142_{1:N}$ and the second plurality of low pass filters $148_{1:N}$ may include an elliptic filter. For a pre-transmit signal 104' at 22 GHz and a 2 GHz passband centered at 19.5 GHz for the first plurality of low pass filters $142_{1:N}$ and the second plurality of low pass filters $148_{1:N}$, the 30 dBm pre-transmit signal 104' may be attenuated to −35 dBm at the output of the elliptic filters in the first plurality of low pass filters $142_{1:N}$ and the second plurality of low pass filters $148_{1:N}$ according to an embodiment. For example, a 20 dB baseband amplifier for an active impedance load may be implemented in silicon while remaining sufficiently linear at this power level for the pre-transmit signal 104'. Also, polyphase filters may be used to recombine I and Q receive components from the first plurality of low pass filters $142_{1:N}$ and the second plurality of low pass filters $148_{1:N}$, and optional baluns may be used to combine differential to single-ended signal and deliver the combined baseband receive signal 166 to the baseband ADC 168.

Figures 8, 9:
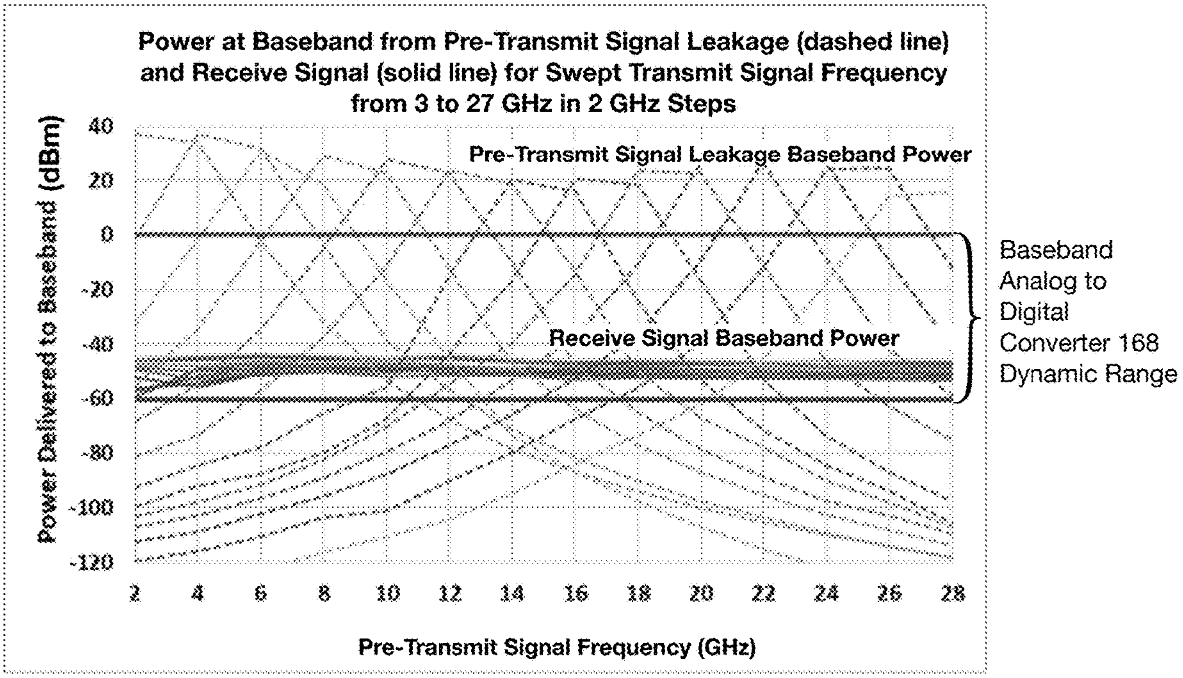
FIG. 8 shows simulation data for signal power at baseband from transmit and receive signals across a range of transmit signal frequencies according to an embodiment.
FIG. 9 shows a table that identifies pairs of receive and transmit frequencies from the simulation data in FIG. 8 for simultaneous transmit and receive signals within a range of a baseband analog-to-digital converter according to an embodiment.

FIG. 8 shows simulation data for signal power at baseband due to pre-transmit signal 104' and receive signal 108 respectively across a range of pre-transmit signal frequencies $f_{Tx}$ according to an embodiment of the frequency division duplex transceiver 102 illustrated in FIGS. 1A-1B. The simulation data shows pre-transmit signal 104' and receive signal 108 power delivered to baseband for a −70 dBm receive signal 108 in band and a 30 dBm pre-transmit signal 104' swept from 3 to 27 GHz. The plot in FIG. 8 shows simulated power delivered to baseband for receive signal 108 from 2-28 GHz with 30 dBm pre-transmit signal 104' at the output of the power amplifier 134 with a pre-transmit signal frequency swept in 2 GHz steps from 3 to 27 GHz. FIG. 9 shows a table that identifies pairs of receive and pre-transmit signal frequencies $f_{Rx}$, $f_{Tx}$ from the simulation data in FIG. 8 for simultaneous pre-transmit signal 104' and receive signal 108 within a dynamic range of the analog-to-digital converter such as the baseband ADC 168 according to an embodiment. The table of FIG. 8 summarizes the set of frequency pairs $f_{Rx}$, $f_{Tx}$ for receive signals 108 and pre-transmit signals 104' that would allow for simultaneous transmit and receive with pre-transmit signal 104' and receive signal 108 within the input range (nominally 0 dBm to −60 dBm) of the analog-to-digital converter such as the baseband ADC 168, according to an embodiment.

A number of example embodiments have been described. Nevertheless, it will be understood that various modifications may be made without departing from the spirit and scope of the devices and methods described herein.

What is claimed is:

1. A frequency division duplex transceiver comprising:

a direct current (DC) voltage supply rail that provides a DC voltage supply;

a quadrature hybrid coupler comprising a first port configured to provide a transmit signal having a transmit frequency and receive a receive signal having a receive frequency different than the transmit frequency, a second port, a third port, and a fourth port;

a pre-transmit signal generator coupled to the second port, wherein the pre-transmit signal generator is configured to provide a pre-transmit signal having the transmit frequency;

a first baseband down-conversion circuit comprising a first shared current source, a first plurality of mixer transistors coupled to the third port and to the first shared current source, and a first plurality of low pass filters coupled to the first plurality of mixer transistors;

a second baseband down-conversion circuit comprising a second shared current source, a second plurality of mixer transistors coupled to the fourth port and to the second shared current source, and a second plurality of low pass filters coupled to the second plurality of mixer transistors; and a local oscillator signal generator configured to provide a plurality of phase-shifted sinusoidal voltage signals having a signal frequency substantially equal to the receive frequency;

wherein:

the first shared current source is configured to cyclically steer a first shared bias current from the DC voltage supply in response to a time varying amplitude of each of the phase-shifted sinusoidal voltage signals to commutate between the first plurality of mixer transistors;

the second shared current source is configured to cyclically steer a second shared bias current from the DC voltage supply in response to the time varying amplitude of each of the phase-shifted sinusoidal voltage signals to commutate between the second plurality of mixer transistors;

the first plurality of low pass filters is configured to reflect a quadrature pre-transmit component of the pre-transmit signal and provide a first plurality of baseband signals having an in-phase receive component of the receive signal;

the second plurality of low pass filters is configured to reflect an in-phase pre-transmit component of the pre-transmit signal and provide a second plurality of baseband signals having a quadrature receive component of the receive signal; and the quadrature hybrid coupler is configured to provide the transmit signal in response to the reflected quadrature pre-transmit component and the reflected in-phase pre-transmit component.

2. The frequency division duplex transceiver of claim 1, wherein each mixer transistor in the first plurality of mixer transistors has a gate coupled to the local oscillator signal generator, a source coupled to the third port and to a first end of the first shared current source, and a drain coupled to a corresponding one of the low pass filters in the first plurality of low pass filters; and each mixer transistor in the second plurality of mixer transistors has a gate coupled to the local oscillator signal generator, a source coupled to the fourth port and to a first end of the second shared current source, and a drain coupled to a corresponding one of the low pass filters in the second plurality of low pass filters.

3. The frequency division duplex transceiver of claim 2, further comprising:

a phase shifter coupled between the local oscillator signal generator and the second plurality of mixer transistors;

wherein:

the plurality of phase-shifted sinusoidal voltage signals is a first plurality of phase-shifted sinusoidal voltage signals;

the phase shifter is configured to rearrange the first plurality of phase-shifted sinusoidal voltage signals into a second plurality of phase-shifted sinusoidal voltage signals, wherein each phase-shifted sinusoidal voltage signal in the second plurality of phase-shifted sinusoidal voltage signals is phase-shifted from a corresponding one of the first plurality of phase-shifted sinusoidal voltage signals; and each phase-shifted sinusoidal voltage signal in the second plurality of phase-shifted sinusoidal voltage signals is routed to the gate of a corresponding one of the mixer transistors in the second plurality of mixer transistors.

4. The frequency division duplex transceiver of claim 1 further comprising:

the first baseband down-conversion circuit comprises a first plurality of drain supply loads, wherein each drain supply load in the first plurality of drain supply loads is coupled between the DC voltage supply rail and a drain of a corresponding mixer transistor in the first plurality of mixer transistors; and the second baseband down-conversion circuit comprises a second plurality of drain supply loads, wherein each drain supply load in the second plurality of drain supply loads is coupled between the DC voltage supply rail and a drain of a corresponding mixer transistor in the second plurality of mixer transistors.

5. The frequency division duplex transceiver of claim 1, wherein:

the first plurality of mixer transistors is configured to provide a first plurality of mixed signals having the in-phase receive component of the receive signal in response to the first shared bias current and the time varying amplitude of each of the phase-shifted sinusoidal voltage signals; and the second plurality of mixer transistors is configured to provide a second plurality of mixed signals having the quadrature receive component of the receive signal in response to the second shared bias current and the time varying amplitude of each of the phase-shifted sinusoidal voltage signals.

6. The frequency division duplex transceiver of claim 4, further comprising a ground terminal coupled to a second end of the first shared current source and a second end of the second shared current source, wherein the first shared current source comprises a first inductor and the second shared current source comprises a second inductor, and the first inductor and the second inductor are each configured as a direct current biasing inductor shunt to the ground terminal.

7. The frequency division duplex transceiver of claim 1, wherein:

the first port has an input impedance;

each low pass filter in the first plurality of low pass filters and the second plurality of low pass filters comprises a filter load having a receiver load impedance at the receive frequency and a transmitter load impedance at the transmit frequency;

the receiver load impedance substantially matches the input impedance to pass the in-phase receive component and the quadrature receive component; and the transmitter load impedance substantially mismatches the input impedance to reflect the quadrature pre-transmit component and the in-phase pre-transmit component.

8. The frequency division duplex transceiver of claim 1, further comprising a combiner configured to provide a combined baseband receive signal in response to the first plurality of baseband signals and the second plurality of baseband signals.

9. The frequency division duplex transceiver of claim 1, further comprising:

a combiner coupled between the first plurality of low pass filters and the second plurality of low pass filters;

a baseband receiver path coupled to the combiner;

wherein:

the first plurality of baseband signals comprising a first plurality of receive components associated with the in-phase receive component of the receive signal and a first plurality of pre-transmit leakage components associated with the quadrature pre-transmit component of the pre-transmit signal;

the second plurality of baseband signals comprising a second plurality of receive components associated with the quadrature receive component of the receive signal and a second plurality of pre-transmit leakage components associated with the in-phase pre-transmit component of the pre-transmit signal; and the combiner is configured to a) provide a combined baseband receive signal to the baseband receiver path in response to the first plurality of receive components and the second plurality of receive components; and b) suppress the first plurality of pre-transmit leakage components and the second plurality of pre-transmit leakage components from propagating into the baseband receiver path.

10. A frequency division duplex transceiver for transmission of a transmit signal and baseband down-conversion of a receive signal, the frequency division duplex transceiver comprising:

a direct current (DC) voltage supply rail that provides a DC voltage supply;

a quadrature hybrid coupler comprising a first port configured to provide the transmit signal having a transmit frequency and receive a receive signal having a receive frequency different than the transmit frequency, a second port, a third port, and a fourth port;

a transmit signal generator configured to provide a pre-transmit signal having the transmit frequency to the second port;

a first baseband down-conversion circuit comprising a first plurality of mixer transistors and a first shared current source that is configured to draw a first shared bias current from the DC voltage supply, wherein a source of each mixer transistor in the first plurality of mixer transistors is coupled to the third port and a first end of the first shared current source;

a second baseband down-conversion circuit comprising a second plurality of mixer transistors and a second shared current source that is configured to draw a second shared bias current from the DC voltage supply, wherein a source of each mixer transistor in the second plurality of mixer transistors is coupled to the fourth port and a first end of the second shared current source; and a local oscillator signal generator coupled to a gate of each mixer transistor in the first plurality of mixer transistors and the second plurality of mixer transistors, wherein the local oscillator signal generator is configured to provide a plurality of phase-shifted sinusoidal voltage signals having a signal frequency that is substantially equal to the receive frequency;

wherein:

the first baseband down-conversion circuit is configured to reflect a quadrature pre-transmit component of the pre-transmit signal, and to generate a plurality of first baseband signals in response to an in-phase receive component of the receive signal, the first shared bias current, and the plurality of phase-shifted sinusoidal voltage signals;

the second baseband down-conversion circuit is configured to reflect an in-phase pre-transmit component of the pre-transmit signal, and generate a second plurality of baseband signals in response to a quadrature receive component of the receive signal, the second shared bias current, and the plurality of phase-shifted sinusoidal voltage signals; and the quadrature hybrid coupler is configured to provide the transmit signal in response to the reflected quadrature pre-transmit component and the reflected in-phase pre-transmit component.

11. The frequency division duplex transceiver of claim 10, wherein:

the first plurality of mixer transistors is configured to provide a first plurality of mixed signals having the in-phase receive component of the receive signal in response to the first shared bias current and a time varying amplitude of each of the phase-shifted sinusoidal voltage signals; and the second plurality of mixer transistors is configured to provide a second plurality of mixed signals having the quadrature receive component of the receive signal in response to the second shared bias current and the time varying amplitude of each of the phase-shifted sinusoidal voltage signals.

12. The frequency division duplex transceiver of claim 11, wherein:

the first baseband down-conversion circuit comprises a first plurality of low pass filters configured to generate the first plurality of baseband signals in response to the first plurality of mixed signals, wherein a drain of each mixer transistor in the first plurality of mixer transistors is a coupled to a corresponding low pass filter in the first plurality low pass filters; and the second baseband down-conversion circuit comprises a second plurality of low pass filters configured to generate the second plurality of baseband signals in response to the second plurality of mixed signals, wherein a drain of each mixer transistor in the second plurality of mixer transistors is coupled to a corresponding low pass filter in the second plurality low pass filters.

13. The frequency division duplex transceiver of claim 10, wherein:

the first baseband down-conversion circuit comprises a first plurality of drain supply loads, wherein each drain supply load in the first plurality of drain supply loads is coupled between the DC voltage supply rail and a drain of a corresponding mixer transistor in the first plurality of mixer transistors; and the second baseband down-conversion circuit comprises a second plurality of drain supply loads, wherein each drain supply load in the second plurality of drain supply loads is coupled between the DC voltage supply rail and a drain of a corresponding mixer transistor in the second plurality of mixer transistors.

14. The frequency division duplex transceiver of claim 10, further comprising a ground terminal coupled to a second end of the first shared current source and a second end of the second shared current source, wherein the first shared current source comprises a first inductor and the second shared current source comprises a second inductor, and the first inductor and the second inductor are each configured as a direct current biasing inductor shunt to the ground terminal.

15. The frequency division duplex transceiver of claim 10, wherein:

the first port has an input impedance;

the first baseband down-conversion circuit comprises a first plurality of low pass filter loads having a receiver load impedance at the receive frequency and a transmitter load impedance at the transmit frequency;

the second baseband down-conversion circuit comprises a second plurality of low pass filter loads having the receiver load impedance and the transmitter load impedance;

the receiver load impedance substantially matches the input impedance to pass the in-phase receive component and the quadrature receive component; and the transmitter load impedance substantially mismatches the input impedance to reflect the quadrature pre-transmit component and the in-phase pre-transmit component.

16. The frequency division duplex transceiver of claim 10, further comprising a combiner configured to provide a combined baseband receive signal in response to the first plurality of baseband signals and the second plurality of baseband signals.

17. The frequency division duplex transceiver of claim 10, further comprising:

a phase shifter coupled between the local oscillator signal generator and the second plurality of mixer transistors;

wherein:

the plurality of phase-shifted sinusoidal voltage signals is a first plurality of phase-shifted sinusoidal voltage signals;

the phase shifter is configured to rearrange the first plurality of phase-shifted sinusoidal voltage signals into a second plurality of phase-shifted sinusoidal voltage signals, wherein each phase-shifted sinusoidal voltage signal in the second plurality of phase-shifted sinusoidal voltage signals is phase-shifted from a corresponding one of the first plurality of phase-shifted sinusoidal voltage signals; and each phase-shifted sinusoidal voltage signal in the second plurality of phase-shifted sinusoidal voltage signals is routed to the gate of a corresponding one of the mixer transistors in the second plurality of mixer transistors.

18. The frequency division duplex transceiver of claim 10, further comprising:

a combiner coupled between the first baseband down conversion circuit and the second baseband down conversion circuit;

a baseband receiver path coupled to the combiner;

wherein:

the first plurality of baseband signals comprising a first plurality of receive components associated with the in-phase receive component of the receive signal and a first plurality of pre-transmit leakage components associated with the quadrature pre-transmit component of the pre-transmit signal;

the second plurality of baseband signals comprising a second plurality of receive components associated with the quadrature receive component of the receive signal and a second plurality of pre-transmit leakage components associated with the in-phase pre-transmit component of the pre-transmit signal; and the combiner is configured to a) provide a combined baseband receive signal to the baseband receiver path in response to the first plurality of receive components and the second plurality of receive components; and b) suppress the first plurality of pre-transmit leakage components and the second plurality of pre-transmit leakage components from propagating into the baseband receiver path.

19. A method of providing a transmit signal and a baseband receive signal in a frequency division duplex transceiver, the method comprising:

receiving a receive signal having a receive frequency at an antenna port;

generating a pre-transmit signal having a transmit frequency that is different than the receive frequency;

generating a plurality of phase-shifted sinusoidal voltage signals having a signal frequency that is substantially equal to the receive frequency;

cyclically steering a first shared bias current to commutate between a first plurality of mixer transistors in response to a time varying amplitude of each of the phase-shifted sinusoidal voltage signals to provide a first plurality of mixed signals having an in-phase receive component of the receive signal;

cyclically steering a second shared bias current to commutate between a second plurality of mixer transistors in response to the time varying amplitude of each of the phase-shifted sinusoidal voltage signals to provide a second plurality of mixed signals having a quadrature receive component of the receive signal;

providing a first plurality of baseband signals in response to the first plurality of mixed signals and a receiver load impedance that substantially matches an input impedance of the antenna port at the receive frequency;

providing a second plurality of baseband signals in response to the second plurality of mixed signals and the receiver load impedance;

reflecting an in-phase pre-transmit component of the pre-transmit signal in response to a transmitter load impedance that substantially mismatches the input impedance of the antenna port at the transmit frequency;

reflecting a quadrature pre-transmit component of the pre-transmit signal in response to the transmitter load impedance;

combining the first plurality of baseband signals and the second plurality of baseband signals to provide the baseband receive signal; and providing the transmit signal to the antenna port in response to the reflected quadrature pre-transmit component and the reflected in-phase pre-transmit component.

20. The method of claim 19, further comprising:

providing the in-phase receive component and the quadrature pre-transmit component to a quadrature hybrid coupler port that is coupled to a source of each mixer transistor in the first plurality of mixer transistors; and providing the quadrature receive component and the in-phase pre-transmit component to another quadrature hybrid coupler port that is coupled to a source of each mixer transistor in the second plurality of mixer transistors.

21. The method of claim 19 further comprising:

associating the first plurality of mixed signals with a first plurality of low pass filters having the receiver load impedance at the receive frequency to provide the first plurality of baseband signals and the transmitter load impedance at the transmit frequency to reflect the quadrature pre-transmit component of the pre-transmit signal; and associating the second plurality of mixed signals with a second plurality of low pass filters having the receiver load impedance at the receive frequency to provide the second plurality of baseband signals and the transmitter load impedance at the transmit frequency to reflect the in-phase pre-transmit component of the pre-transmit signal.

22. The method of claim 19, further comprising:

providing the first shared bias current to configure one of the mixer transistors in the first plurality of mixer transistors to operate in its saturation mode in response to the time varying amplitude of a corresponding one of the plurality of phase-shifted sinusoidal voltage signals that drives a gate of the one of the mixer transistors in the first plurality of mixer transistors; and providing the second shared bias current to configure one of the mixer transistors in the second plurality of mixer transistors to operate in its saturation mode in response to the time varying amplitude of a corresponding one of the plurality of phase-shifted sinusoidal voltage signals that drives a gate of the one of the mixer transistors in the second plurality of mixer transistors.

23. The method of claim 22, further comprising:

steering substantially all of the first shared bias current away from another one of the mixer transistors in the first plurality of mixer transistors when an instantaneous gate voltage from the time varying amplitude of a corresponding one of the plurality of phase-shifted sinusoidal voltage signals associated with the gate of the another one of the mixer transistors in the first plurality of mixer transistors is below a cut-off mode voltage threshold $V_{off}$; and steering substantially all of the second shared bias current away from another one of the mixer transistors in the second plurality of mixer transistors when the instantaneous gate voltage from the time varying amplitude of a corresponding one of the plurality of phase-shifted sinusoidal voltage signals associated with the gate of the another one of the mixer transistors in the second plurality of mixer transistors is below the cut-off mode voltage threshold $V_{off}$.

24. The method of claim 22, wherein the plurality of phase-shifted sinusoidal voltage signals is a first plurality of phase-shifted sinusoidal voltage signals, the method further comprising:

rearranging the first plurality of phase-shifted sinusoidal voltage signals into a second plurality of phase-shifted sinusoidal voltage signals, wherein each phase-shifted sinusoidal voltage signal in the second plurality of phase-shifted sinusoidal voltage signals is phase-shifted from a corresponding one of the first plurality of phase-shifted sinusoidal voltage signals; and routing each phase-shifted sinusoidal voltage signal in the second plurality of phase-shifted sinusoidal voltage signals to the gate of a corresponding one of the mixer transistors in the second plurality of mixer transistors.

25. The method of claim 19, further comprising:

steering substantially all of the first shared bias current to the one of the mixer transistors in the first plurality of mixer transistors when an instantaneous gate voltage from the time varying amplitude of the corresponding one of the plurality of phase-shifted sinusoidal voltage signals is above a saturation mode voltage threshold $V_{sat}$; and steering substantially all of the second shared bias current to the one of the mixer transistors in the second plurality of mixer transistors when the instantaneous gate voltage from the time varying amplitude of the corresponding one of the plurality of phase-shifted sinusoidal voltage signals is above the saturation mode voltage threshold $V_{sat}$.

26. The method of claim 19, further comprising:

providing a combined baseband receive signal in response to a first plurality of receive components associated with the in-phase receive component of the receive signal and a second plurality of receive components associated the quadrature receive component of the receive signal;

providing a baseband receiver path for the combined baseband receive signal; and suppressing pre-transmit signal leakage in the baseband receiver path in response to a first plurality of pre-transmit leakage components associated with the in-phase pre-transmit component of the pre-transmit signal and a second plurality of pre-transmit leakage components associated with the quadrature pre-transmit component of the pre-transmit signal.

* * * * *